US 9,705,760 B2

(12) United States Patent
Mallet et al.

(10) Patent No.: US 9,705,760 B2
(45) Date of Patent: *Jul. 11, 2017

(54) MEASURING AFFINITY LEVELS VIA PASSIVE AND ACTIVE INTERACTIONS

(71) Applicant: LinkedIn Corporation, Mountain View, CA (US)

(72) Inventors: Vincent Mallet, Portola Valley, CA (US); Jessica Cheng, Mountain View, CA (US); Noah Fiedel, Palo Alto, CA (US); Eric William Gillum, Sunnyvale, CA (US); Ganesh Ramanarayanan, Menlo Park, CA (US); Nicholas James Woods, San Francisco, CA (US)

(73) Assignee: LinkedIn Corporation, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/754,549

(22) Filed: Jun. 29, 2015

(65) Prior Publication Data
US 2015/0304432 A1    Oct. 22, 2015

Related U.S. Application Data

(63) Continuation of application No. 13/887,529, filed on May 6, 2013, now Pat. No. 9,071,509, which is a (Continued)

(51) Int. Cl.
*H04L 12/26*    (2006.01)
*G06Q 50/00*    (2012.01)
(Continued)

(52) U.S. Cl.
CPC ........ *H04L 43/04* (2013.01); *G06F 15/17306* (2013.01); *G06F 17/30598* (2013.01); (Continued)

(58) Field of Classification Search
CPC ... H04L 67/06; H04L 67/1095; H04L 67/141; H04L 67/18; H04L 67/306; H04L 43/04; (Continued)

(56) References Cited

U.S. PATENT DOCUMENTS 4,393,025 A    7/1983    Leyse
5,991,808 A    11/1999    Broder et al.
(Continued)

FOREIGN PATENT DOCUMENTS

CN    1437818 A    8/2003
CN    101561820 A    10/2009
(Continued)

OTHER PUBLICATIONS

"U.S. Appl. No. 13/851,606, Notice of Allowance mailed Nov. 23, 2015", 16 pgs.
(Continued)

*Primary Examiner* — Michael C Lai
(74) *Attorney, Agent, or Firm* — Schwegman Lundberg & Woessner, P.A.

(57) ABSTRACT

Systems and methods for the measuring of affinity levels via passive and active interactions are provided. A first group of users are selected from a plurality of possible groups of users. Affinity levels are measured among the users of the first group, the affinity levels based at least partially on both passive and active interactions between an electronic device of a first user and electronic devices of users in the first group. The first user is added to the first group based on the affinity levels.

20 Claims, 21 Drawing Sheets

US 9,705,760 B2
Page 2

Related U.S. Application Data continuation of application No. 13/404,381, filed on Feb. 24, 2012, now Pat. No. 8,539,086.

(60) Provisional application No. 61/466,849, filed on Mar. 23, 2011.

(51) Int. Cl.

| | | |
|---|---|---|
| *G06F 17/30* | (2006.01) | |
| *H04L 12/18* | (2006.01) | |
| *H04L 12/58* | (2006.01) | |
| *H04W 4/02* | (2009.01) | |
| *H04L 29/08* | (2006.01) | |
| *H04L 29/06* | (2006.01) | |
| *G06F 15/173* | (2006.01) | |
| *H04L 29/12* | (2006.01) | |
| *H04W 4/08* | (2009.01) | |

(52) U.S. Cl.
CPC .. *G06F 17/30601* (2013.01); *G06F 17/30867* (2013.01); *G06F 17/30876* (2013.01); *G06Q 50/01* (2013.01); *H04L 12/1827* (2013.01); *H04L 12/581* (2013.01); *H04L 43/045* (2013.01); *H04L 51/04* (2013.01); *H04L 51/08* (2013.01); *H04L 51/10* (2013.01); *H04L 51/14* (2013.01); *H04L 51/20* (2013.01); *H04L 61/609* (2013.01); *H04L 65/403* (2013.01); *H04L 67/06* (2013.01); *H04L 67/1095* (2013.01); *H04L 67/141* (2013.01); *H04L 67/18* (2013.01); *H04L 67/26* (2013.01); *H04L 67/306* (2013.01); *H04W 4/02* (2013.01); *H04W 4/08* (2013.01); *Y10S 707/99935* (2013.01); *Y10S 707/99954* (2013.01)

(58) Field of Classification Search
CPC ....... H04L 51/04; H04L 51/20; H04L 65/403; H04W 4/02; H04W 4/08
See application file for complete search history.

(56) References Cited

U.S. PATENT DOCUMENTS

| | | | |
|---|---|---|---|
| 6,128,657 A | 10/2000 | Okanoya et al. | |
| 6,205,477 B1 | 3/2001 | Johnson et al. | |
| 6,240,454 B1 | 5/2001 | Nepustil | |
| 6,993,325 B1 | 1/2006 | Waesterlid | |
| 7,058,958 B1 | 6/2006 | Shutt et al. | |
| 7,177,904 B1 | 2/2007 | Mathur et al. | |
| 7,266,383 B2 | 9/2007 | Anderson | |
| 7,546,369 B2 | 6/2009 | Berg | |
| 7,644,144 B1 | 1/2010 | Horvitz et al. | |
| 7,680,770 B1 | 3/2010 | Buyukkokten et al. | |
| 7,702,728 B2 | 4/2010 | Zaner et al. | |
| 7,730,216 B1 | 6/2010 | Issa et al. | |
| 7,813,277 B2 | 10/2010 | Okholm et al. | |
| 7,886,024 B2 | 2/2011 | Kelly et al. | |
| 7,886,327 B2 | 2/2011 | Stevens | |
| 7,938,727 B1 | 5/2011 | Konkle | |
| 7,954,058 B2 | 5/2011 | Kalaboukis et al. | |
| 7,958,193 B2 | 6/2011 | Augustine et al. | |
| 7,970,111 B2 | 6/2011 | Swanburg | |
| 7,970,350 B2 | 6/2011 | Sheynman et al. | |
| 7,970,418 B2 | 6/2011 | Schmidt et al. | |
| 7,975,062 B2 | 7/2011 | Krikorian et al. | |
| 7,996,566 B1 | 8/2011 | Sylvain et al. | |
| 8,010,602 B2 | 8/2011 | Shen et al. | |
| 8,051,157 B2 | 11/2011 | Park et al. | |
| 8,103,729 B2 | 1/2012 | Tornabene et al. | |
| 8,108,414 B2 | 1/2012 | Stackpole | |
| 8,145,532 B2 | 3/2012 | Jones et al. | |
| 8,150,844 B2 | 4/2012 | Redstone et al. | |
| 8,181,071 B2 | 5/2012 | Cahill et al. | |
| 8,214,862 B1 | 7/2012 | Lee et al. | |
| 8,239,445 B1 | 8/2012 | Gage et al. | |
| 8,311,950 B1 | 11/2012 | Kunal et al. | |
| 8,327,012 B1 | 12/2012 | Nguyen et al. | |
| 8,364,708 B1 | 1/2013 | Braytenbaum | |
| 8,370,208 B1 | 2/2013 | Gupta et al. | |
| 8,386,619 B2 | 2/2013 | Mallet et al. | |
| 8,392,526 B2 | 3/2013 | Mallet et al. | |
| 8,412,772 B1 | 4/2013 | Nguyen et al. | |
| 8,428,604 B2 | 4/2013 | Davies et al. | |
| 8,438,233 B2 | 5/2013 | Mallet et al. | |
| 8,473,550 B2 | 6/2013 | Nguyen et al. | |
| 8,539,086 B2 | 9/2013 | Mallet et al. | |
| 8,583,690 B2 | 11/2013 | Sittig et al. | |
| 8,621,019 B2 | 12/2013 | Nguyen et al. | |
| 8,732,255 B2 | 5/2014 | Odio et al. | |
| 8,843,630 B1 | 9/2014 | Thomas et al. | |
| 8,868,739 B2 | 10/2014 | Mallet et al. | |
| 8,880,609 B2 | 11/2014 | Mallet et al. | |
| 8,886,807 B2 | 11/2014 | Nguyen et al. | |
| 8,892,653 B2 | 11/2014 | Mallet et al. | |
| 8,930,459 B2 | 1/2015 | Mallet et al. | |
| 8,935,332 B2 | 1/2015 | Mallet et al. | |
| 8,943,137 B2 | 1/2015 | Mallet et al. | |
| 8,943,138 B2 | 1/2015 | Mallet et al. | |
| 8,943,157 B2 | 1/2015 | Mallet et al. | |
| 8,954,506 B2 | 2/2015 | Mallet et al. | |
| 8,959,153 B2 | 2/2015 | Mallet et al. | |
| 8,965,990 B2 | 2/2015 | Mallet et al. | |
| 8,972,501 B2 | 3/2015 | Mallet et al. | |
| 9,071,509 B2 | 6/2015 | Mallet et al. | |
| 9,094,289 B2 | 7/2015 | Mallet et al. | |
| 9,119,027 B2 | 8/2015 | Sharon et al. | |
| 9,131,028 B2 | 9/2015 | Nguyen et al. | |
| 9,154,536 B2 | 10/2015 | Nguyen et al. | |
| 9,306,998 B2 | 4/2016 | Nguyen et al. | |
| 9,325,652 B2 | 4/2016 | Mallet et al. | |
| 9,413,705 B2 | 8/2016 | Mallet et al. | |
| 9,413,706 B2 | 8/2016 | Mallet et al. | |
| 9,497,240 B2 | 11/2016 | Nguyen et al. | |
| 9,536,270 B2 | 1/2017 | Mallet et al. | |
| 2002/0052942 A1 | 5/2002 | Swildens et al. | |
| 2003/0004916 A1 | 1/2003 | Lewis | |
| 2003/0069867 A1 | 4/2003 | Coutts et al. | |
| 2003/0093462 A1 | 5/2003 | Koskelainen et al. | |
| 2003/0126197 A1 | 7/2003 | Black et al. | |
| 2004/0205219 A1 | 10/2004 | Li | |
| 2004/0236850 A1 | 11/2004 | Krumm et al. | |
| 2005/0091315 A1 | 4/2005 | Hurtta | |
| 2005/0177614 A1 | 8/2005 | Bourne | |
| 2005/0188098 A1 | 8/2005 | Dunk | |
| 2005/0193099 A1 | 9/2005 | Reus et al. | |
| 2005/0193115 A1 | 9/2005 | Chellis et al. | |
| 2005/0197846 A1 | 9/2005 | Pezaris et al. | |
| 2005/0266835 A1 | 12/2005 | Agrawal et al. | |
| 2006/0004680 A1 | 1/2006 | Robarts et al. | |
| 2006/0047751 A1 | 3/2006 | Chen et al. | |
| 2006/0109083 A1 | 5/2006 | Rathus et al. | |
| 2006/0146765 A1 | 7/2006 | Van De Sluis et al. | |
| 2006/0159109 A1 | 7/2006 | Lamkin et al. | |
| 2006/0168230 A1 | 7/2006 | Caccavale et al. | |
| 2006/0212529 A1 | 9/2006 | Choi et al. | |
| 2006/0230170 A1 | 10/2006 | Chintala et al. | |
| 2006/0241860 A1 | 10/2006 | Kimchi et al. | |
| 2006/0242234 A1* | 10/2006 | Counts ................ | H04W 4/08 709/204 |
| 2007/0011498 A1 | 1/2007 | Shaffer et al. | |
| 2007/0027972 A1 | 2/2007 | Agrawal et al. | |
| 2007/0032244 A1 | 2/2007 | Counts et al. | |
| 2007/0180113 A1 | 8/2007 | Van Bemmel | |
| 2007/0226799 A1 | 9/2007 | Gopalan et al. | |
| 2007/0237096 A1 | 10/2007 | Vengroff et al. | |
| 2007/0255579 A1 | 11/2007 | Boland et al. | |
| 2007/0270074 A1 | 11/2007 | Aochi et al. | |
| 2008/0005684 A1 | 1/2008 | Ochs | |
| 2008/0059992 A1 | 3/2008 | Amidon et al. | |
| 2008/0086431 A1 | 4/2008 | Robinson et al. | |
| 2008/0098087 A1 | 4/2008 | Lubeck | |

(56) References Cited

U.S. PATENT DOCUMENTS

| | | |
|---|---|---|
| 2008/0114737 A1 | 5/2008 | Neely et al. |
| 2008/0133658 A1 | 6/2008 | Pennington |
| 2008/0133767 A1 | 6/2008 | Birrer et al. |
| 2008/0134235 A1 | 6/2008 | Kalaboukis |
| 2008/0140650 A1* | 6/2008 | Stackpole ........... G06F 17/3087 |
| 2008/0177861 A1 | 7/2008 | Basani et al. |
| 2008/0222295 A1 | 9/2008 | Robinson et al. |
| 2008/0222308 A1 | 9/2008 | Abhyanker |
| 2009/0089683 A1 | 4/2009 | Thapa et al. |
| 2009/0144392 A1 | 6/2009 | Wang et al. |
| 2009/0148124 A1 | 6/2009 | Athsani et al. |
| 2009/0158176 A1 | 6/2009 | Kalaboukis et al. |
| 2009/0164600 A1 | 6/2009 | Issa et al. |
| 2009/0172152 A1 | 7/2009 | Patiejunas et al. |
| 2009/0177604 A1 | 7/2009 | Alperin |
| 2009/0187936 A1 | 7/2009 | Parekh et al. |
| 2009/0192887 A1 | 7/2009 | Moore et al. |
| 2009/0215469 A1 | 8/2009 | Fisher et al. |
| 2009/0228559 A1 | 9/2009 | Campbell et al. |
| 2009/0231411 A1 | 9/2009 | Yan |
| 2009/0232408 A1 | 9/2009 | Meany |
| 2009/0265257 A1 | 10/2009 | Klinger et al. |
| 2009/0265426 A1 | 10/2009 | Svendsen et al. |
| 2009/0288120 A1 | 11/2009 | Vasudevan et al. |
| 2009/0313578 A1 | 12/2009 | Roh et al. |
| 2009/0319288 A1 | 12/2009 | Slaney et al. |
| 2010/0031156 A1 | 2/2010 | Doyle et al. |
| 2010/0036912 A1 | 2/2010 | Rao |
| 2010/0037141 A1 | 2/2010 | Carter et al. |
| 2010/0042660 A1 | 2/2010 | Rinearson et al. |
| 2010/0048242 A1 | 2/2010 | Rhoads et al. |
| 2010/0064334 A1 | 3/2010 | Blackburn et al. |
| 2010/0070542 A1 | 3/2010 | Feinsmith |
| 2010/0110160 A1 | 5/2010 | Brandt |
| 2010/0135643 A1 | 6/2010 | Fleming |
| 2010/0142447 A1 | 6/2010 | Schlicht et al. |
| 2010/0144426 A1 | 6/2010 | Winner et al. |
| 2010/0146115 A1 | 6/2010 | Bezos |
| 2010/0153175 A1 | 6/2010 | Pearson |
| 2010/0185630 A1 | 7/2010 | Cheng et al. |
| 2010/0191728 A1 | 7/2010 | Reilly et al. |
| 2010/0191836 A1 | 7/2010 | Knight |
| 2010/0199295 A1 | 8/2010 | Katpelly et al. |
| 2010/0208033 A1 | 8/2010 | Edge et al. |
| 2010/0217866 A1 | 8/2010 | Nandagopal et al. |
| 2010/0250458 A1 | 9/2010 | Ho |
| 2010/0287053 A1 | 11/2010 | Ganong et al. |
| 2010/0293190 A1 | 11/2010 | Kaiser |
| 2010/0293198 A1 | 11/2010 | Marinucci et al. |
| 2010/0299391 A1 | 11/2010 | Demarta et al. |
| 2011/0016399 A1 | 1/2011 | Yasrebi et al. |
| 2011/0029608 A1 | 2/2011 | Harple et al. |
| 2011/0034176 A1 | 2/2011 | Lord et al. |
| 2011/0052155 A1 | 3/2011 | Desmarais et al. |
| 2011/0055289 A1 | 3/2011 | Ennis |
| 2011/0061108 A1 | 3/2011 | Arrasvuori et al. |
| 2011/0066743 A1 | 3/2011 | Hurley et al. |
| 2011/0072078 A1 | 3/2011 | Chai et al. |
| 2011/0072114 A1 | 3/2011 | Hoffert et al. |
| 2011/0078129 A1 | 3/2011 | Chunilal |
| 2011/0082915 A1 | 4/2011 | Carr et al. |
| 2011/0083037 A1 | 4/2011 | Bocharov et al. |
| 2011/0083101 A1* | 4/2011 | Sharon ................ G06F 21/6245 715/800 |
| 2011/0093784 A1 | 4/2011 | Kiraz et al. |
| 2011/0103356 A1 | 5/2011 | Chandrasekaran |
| 2011/0131100 A1 | 6/2011 | Soza et al. |
| 2011/0137976 A1 | 6/2011 | Poniatowski et al. |
| 2011/0143811 A1 | 6/2011 | Rodriguez |
| 2011/0153740 A1 | 6/2011 | Smith et al. |
| 2011/0154223 A1 | 6/2011 | Whitnah et al. |
| 2011/0161319 A1 | 6/2011 | Chunilal |
| 2011/0161348 A1 | 6/2011 | Oron |
| 2011/0173235 A1 | 7/2011 | Aman et al. |
| 2011/0179025 A1 | 7/2011 | Chuang |
| 2011/0188742 A1 | 8/2011 | Yu et al. |
| 2011/0191447 A1 | 8/2011 | Dazzi et al. |
| 2011/0202430 A1 | 8/2011 | Narayanan et al. |
| 2011/0209191 A1 | 8/2011 | Shah |
| 2011/0211737 A1 | 9/2011 | Krupka et al. |
| 2011/0212717 A1 | 9/2011 | Rhoads et al. |
| 2011/0214059 A1 | 9/2011 | King et al. |
| 2011/0216075 A1 | 9/2011 | Shigeta et al. |
| 2011/0225608 A1 | 9/2011 | Lopatecki et al. |
| 2011/0228918 A1 | 9/2011 | Ayers et al. |
| 2011/0231488 A1 | 9/2011 | Xu |
| 2011/0231494 A1 | 9/2011 | Pasquero et al. |
| 2011/0238755 A1 | 9/2011 | Khan et al. |
| 2011/0246574 A1 | 10/2011 | Lento et al. |
| 2011/0249078 A1 | 10/2011 | Abuan et al. |
| 2011/0258556 A1 | 10/2011 | Kiciman et al. |
| 2011/0267269 A1 | 11/2011 | Tardif et al. |
| 2011/0270719 A1 | 11/2011 | Hollars et al. |
| 2011/0279637 A1 | 11/2011 | Periyannan et al. |
| 2011/0282947 A1 | 11/2011 | Dodson |
| 2011/0282965 A1 | 11/2011 | Dodson |
| 2011/0283203 A1 | 11/2011 | Periyannan et al. |
| 2011/0283236 A1 | 11/2011 | Beaumier et al. |
| 2011/0296004 A1 | 12/2011 | Swahar |
| 2011/0302050 A1 | 12/2011 | Kildevaeld |
| 2011/0311199 A1 | 12/2011 | Fay et al. |
| 2012/0016817 A1 | 1/2012 | Smith et al. |
| 2012/0019610 A1 | 1/2012 | Hornyak et al. |
| 2012/0041822 A1 | 2/2012 | Landry et al. |
| 2012/0041907 A1 | 2/2012 | Wang et al. |
| 2012/0047565 A1 | 2/2012 | Petersen |
| 2012/0059884 A1 | 3/2012 | Rothschild |
| 2012/0066722 A1 | 3/2012 | Cheung et al. |
| 2012/0079119 A1 | 3/2012 | Gill et al. |
| 2012/0083286 A1 | 4/2012 | Kim et al. |
| 2012/0084666 A1 | 4/2012 | Hickman |
| 2012/0084731 A1 | 4/2012 | Filman et al. |
| 2012/0092439 A1 | 4/2012 | Mackie et al. |
| 2012/0102124 A1 | 4/2012 | Hansson et al. |
| 2012/0102403 A1 | 4/2012 | Pennington et al. |
| 2012/0113285 A1 | 5/2012 | Baker et al. |
| 2012/0192220 A1 | 7/2012 | Wyatt et al. |
| 2012/0192225 A1 | 7/2012 | Harwell et al. |
| 2012/0192239 A1 | 7/2012 | Harwell et al. |
| 2012/0197732 A1 | 8/2012 | Shen et al. |
| 2012/0203831 A1 | 8/2012 | Schoen et al. |
| 2012/0221639 A1 | 8/2012 | Mallet et al. |
| 2012/0246244 A1 | 9/2012 | Mallet et al. |
| 2012/0246266 A1 | 9/2012 | Mallet et al. |
| 2012/0246267 A1 | 9/2012 | Mallet et al. |
| 2012/0317235 A1 | 12/2012 | Nguyen et al. |
| 2012/0320013 A1 | 12/2012 | Perez et al. |
| 2013/0013462 A1 | 1/2013 | Deng et al. |
| 2013/0063542 A1 | 3/2013 | Bhat et al. |
| 2013/0073622 A1 | 3/2013 | Nguyen et al. |
| 2013/0073623 A1 | 3/2013 | Nguyen et al. |
| 2013/0073624 A1 | 3/2013 | Nguyen et al. |
| 2013/0204675 A1 | 8/2013 | Dobell |
| 2013/0212232 A1 | 8/2013 | Nguyen et al. |
| 2013/0238739 A1 | 9/2013 | Mallet et al. |
| 2014/0025679 A1 | 1/2014 | Mallet et al. |
| 2014/0025748 A1 | 1/2014 | Mallet et al. |
| 2014/0025765 A1 | 1/2014 | Mallet et al. |
| 2014/0025778 A1 | 1/2014 | Nguyen et al. |
| 2014/0025787 A1 | 1/2014 | Nguyen et al. |
| 2014/0032673 A1 | 1/2014 | Mallet et al. |
| 2014/0032674 A1 | 1/2014 | Nguyen et al. |
| 2014/0068065 A1 | 3/2014 | Mallet et al. |
| 2014/0214948 A1 | 7/2014 | Mallet et al. |
| 2014/0214949 A1 | 7/2014 | Mallet et al. |
| 2014/0214950 A1 | 7/2014 | Mallet et al. |
| 2014/0214951 A1 | 7/2014 | Mallet et al. |
| 2014/0214952 A1 | 7/2014 | Mallet et al. |
| 2014/0214953 A1 | 7/2014 | Mallet et al. |
| 2014/0214954 A1 | 7/2014 | Mallet et al. |
| 2014/0214981 A1 | 7/2014 | Mallet et al. |
| 2015/0207835 A1 | 7/2015 | Nguyen et al. |
| 2015/0281160 A1 | 10/2015 | Mallet et al. |
| 2015/0302078 A1 | 10/2015 | Mallet et al. |

(56) References Cited

U.S. PATENT DOCUMENTS

| | | |
|---|---|---|
| 2015/0302079 A1 | 10/2015 | Mallet et al. |
| 2015/0302080 A1 | 10/2015 | Mallet et al. |
| 2015/0302082 A1 | 10/2015 | Mallet et al. |
| 2015/0346927 A1 | 12/2015 | Nguyen et al. |
| 2015/0346940 A1 | 12/2015 | Nguyen et al. |
| 2015/0350358 A1 | 12/2015 | Nguyen et al. |
| 2015/0350691 A1 | 12/2015 | Nguyen et al. |
| 2015/0355804 A1 | 12/2015 | Nguyen et al. |

FOREIGN PATENT DOCUMENTS

| | | |
|---|---|---|
| CN | 101860563 A | 10/2010 |
| CN | 103797508 A | 5/2014 |
| CN | 104106062 A | 10/2014 |
| DE | 202012012895 U1 | 3/2014 |
| WO | WO-2012129400 A2 | 9/2012 |
| WO | WO-2012129400 A3 | 9/2012 |
| WO | WO-2013044003 A1 | 3/2013 |

OTHER PUBLICATIONS

"U.S. Appl. No. 14/675,503, Examiner Interview Summary mailed Oct. 27, 2015", 3 pgs.

"U.S. Appl. No. 14/675,503, Notice of Allowance mailed Dec. 21, 2015", 5 pgs.

"U.S. Appl. No. 14/675,503, Response filed Nov. 20, 2015 to Non Final Office Action mailed Aug. 20, 2015", 11 pgs.

"U.S. Appl. No. 14/675,512, Notice of Non-Compliant Amendment mailed Nov. 16, 2015", 3 pgs.

"U.S. Appl. No. 14/675,512, Response filed Jan. 14, 2016 to Notice of Non-Compliant Amendment mailed Nov. 6, 2015", 9 pgs.

"European Application Serial No. 12760367.8, Response filed Dec. 16, 2015", 19 pgs.

"U.S. Appl. No. 13/398,227, Examiner Interview Summary mailed Aug. 20, 2012", 3 pgs.

"U.S. Appl. No. 13/398,227, Non Final Office Action mailed Jul. 2, 2012", 23 pgs.

"U.S. Appl. No. 13/398,227, Notice of Allowance mailed Nov. 14, 2012", 16 pgs.

"U.S. Appl. No. 13/398,227, Response filed Aug. 24, 2012 to Non Final Office Action mailed Jul. 2, 2012", 15 pgs.

"U.S. Appl. No. 13/398,296, Non Final Office Action mailed May 14, 2012", 11 pgs.

"U.S. Appl. No. 13/398,296, Notice of Allowance mailed Oct. 10, 2012", 14 pgs.

"U.S. Appl. No. 13/398,296, Response filed Aug. 9, 2012 to Non Final Office Action mailed May 14, 2012", 12 pgs.

"U.S. Appl. No. 13/398,402, 312 Amendment filed Aug. 15, 2013", 10 pgs.

"U.S. Appl. No. 13/398,402, Examiner Interview Summary mailed Aug. 6, 2012", 3 pgs.

"U.S. Appl. No. 13/398,402, Examiner Interview Summary mailed Nov. 15, 2012", 3 pgs.

"U.S. Appl. No. 13/398,402, Non Final Office Action mailed Apr. 12, 2012", 35 pgs.

"U.S. Appl. No. 13/398,402, Non Final Office Action mailed Sep. 28, 2012", 30 pgs.

"U.S. Appl. No. 13/398,402, Notice of Allowance mailed Feb. 6, 2013", 12 pgs.

"U.S. Appl. No. 13/398,402, Notice of Allowance mailed Jun. 10, 2013", 8 pgs.

"U.S. Appl. No. 13/398,402, PTO Response to 312 Amendment mailed Aug. 27, 2013", 2 pgs.

"U.S. Appl. No. 13/398,402, Response filed Jul. 12, 2012 to Non Final Office Action mailed Apr. 12, 2012", 20 pgs.

"U.S. Appl. No. 13/398,402, Response filed Nov. 27, 2012 to Non Final Office Action mailed Sep. 28, 2012", 16 pgs.

"U.S. Appl. No. 13/398,445, Non Final Office Action mailed Jan. 4, 2013", 6 pgs.

"U.S. Appl. No. 13/398,445, Non Final Office Action mailed Jul. 17, 2012", 6 pgs.

"U.S. Appl. No. 13/398,445, Notice of Allowance mailed Feb. 28, 2013", 7 pgs.

"U.S. Appl. No. 13/398,445, Response filed Jan. 18, 2013 to Non Final Office Action mailed Jan. 4, 2013", 8 pgs.

"U.S. Appl. No. 13/398,445, Response filed Jun. 7, 2012 to Restriction Requirement mailed May 11, 2012", 8 pgs.

"U.S. Appl. No. 13/398,445, Response filed Oct. 1, 2012 to Non Final Office Action mailed Jul. 17, 2012", 13 pgs.

"U.S. Appl. No. 13/398,445, Restriction Requirement mailed May 11, 2012", 5 pgs.

"U.S. Appl. No. 13/404,356, Examiner Interview Summary mailed Aug. 13, 2012", 17 pgs.

"U.S. Appl. No. 13/404,356, Examiner Interview Summary mailed Nov. 7, 2012", 3 pgs.

"U.S. Appl. No. 13/404,356, Final Office Action mailed Aug. 31, 2012", 29 pgs.

"U.S. Appl. No. 13/404,356, Non Final Office Action mailed May 8, 2012", 22 pgs.

"U.S. Appl. No. 13/404,356, Notice of Allowance mailed Nov. 27, 2012", 19 pgs.

"U.S. Appl. No. 13/404,356, Response filed Aug. 8, 2012 to Non Final Office Action mailed May 8, 2012", 14 pgs.

"U.S. Appl. No. 13/404,356, Response filed Nov. 5, 2012 to Final Office Action mailed Aug. 31, 2012", 14 pgs.

"U.S. Appl. No. 13/404,370, Examiner Interview Summary mailed Aug. 10, 2012", 3 pgs.

"U.S. Appl. No. 13/404,370, Examiner Interview Summary mailed Nov. 13, 2012", 3 pgs.

"U.S. Appl. No. 13/404,370, Non Final Office Action mailed May 9, 2012", 22 pgs.

"U.S. Appl. No. 13/404,370, Notice of Allowance mailed Nov. 14, 2012", 16 pgs.

"U.S. Appl. No. 13/404,370, Response filed Aug. 9, 2012 to Non Final Office Action mailed May 9, 2012", 12 pgs.

"U.S. Appl. No. 13/404,370, Supplemental Notice of Allowability mailed Jan. 30, 2013", 5 pgs.

"U.S. Appl. No. 13/404,370, Supplemental Notice of Allowability mailed Dec. 19, 2012", 7 pgs.

"U.S. Appl. No. 13/404,381, Examiner Interview Summary mailed Aug. 9, 2012", 3 pgs.

"U.S. Appl. No. 13/404,381, Examiner Interview Summary mailed Nov. 6, 2012", 3 pgs.

"U.S. Appl. No. 13/404,381, Final Office Action mailed Aug. 27, 2012", 24 pgs.

"U.S. Appl. No. 13/404,381, Non Final Office Action mailed May 11, 2012", 19 pgs.

"U.S. Appl. No. 13/404,381, Notice of Allowance mailed Jan. 22, 2013", 7 pgs.

"U.S. Appl. No. 13/404,381, Notice of Allowance mailed May 10, 2013", 9 pgs.

"U.S. Appl. No. 13/404,381, Response filed Aug. 9, 2012 to Non Final Office Action mailed May 11, 2012", 13 pgs.

"U.S. Appl. No. 13/404,381, Response filed Oct. 26, 2012 to Final Office Action mailed Aug. 27, 2012", 14 pgs.

"U.S. Appl. No. 13/404,393, Examiner Interview Summary mailed Aug. 14, 2012", 3 pgs.

"U.S. Appl. No. 13/404,393, Examiner Interview Summary mailed Oct. 29, 2012", 3 pgs.

"U.S. Appl. No. 13/404,393, Non Final Office Action mailed May 16, 2012", 20 pgs.

"U.S. Appl. No. 13/404,393, Notice of Allowance mailed Nov. 27, 2012", 16 pgs.

"U.S. Appl. No. 13/404,393, Response filed Aug. 14, 2012 to Non Final Office Action mailed May 16, 2012", 11 pgs.

"U.S. Appl. No. 13/851,606, Non Final Office Action mailed May 15, 2015", 13 pgs.

"U.S. Appl. No. 13/851,606, Preliminary Amendment filed Nov. 8, 2013", 8 pgs.

"U.S. Appl. No. 13/857,606, Examiner Interview Summary mailed Aug. 3, 2015", 3 pgs.

(56) References Cited

OTHER PUBLICATIONS

"U.S. Appl. No. 13/857,606, Response filed Aug. 5, 2015 to Non Final Office Action mailed May 15, 2015", 10 pgs.
"U.S. Appl. No. 13/887,529, Examiner Interview Summary mailed Sep. 4, 2014", 3 pgs.
"U.S. Appl. No. 13/887,529, Final Office Action mailed Dec. 12, 2014", 11 pgs.
"U.S. Appl. No. 13/887,529, Non Final Office Action mailed Jun. 6, 2014", 10 pgs.
"U.S. Appl. No. 13/887,529, Notice of Allowance mailed Feb. 25, 2015", 7 pgs.
"U.S. Appl. No. 13/887,529, Preliminary Amendment filed May 8, 2013", 6 pgs.
"U.S. Appl. No. 13/887,529, Response filed Feb. 2, 2015 to Final Office Action mailed Dec. 12, 2014", 9 pgs.
"U.S. Appl. No. 13/887,529, Response filed Sep. 8, 2014 to Non Final Office Action mailed Jun. 6, 2014", 10 pgs.
"U.S. Appl. No. 13/887,529, Supplemental Preliminary Amendment mailed Nov. 8, 2013", 8 pgs.
"U.S. Appl. No. 14/034,464, Examiner Interview Summary mailed Jan. 22, 2014", 3 pgs.
"U.S. Appl. No. 14/034,464, Examiner Interview Summary mailed Apr. 1, 2014", 3 pgs.
"U.S. Appl. No. 14/034,464, Examiner Interview Summary mailed Aug. 29, 2014", 3 pgs.
"U.S. Appl. No. 14/034,464, Final Office Action mailed Jun. 11, 2014", 13 pgs.
"U.S. Appl. No. 14/034,464, Non Final Office Action mailed Jan. 3, 2014", 13 pgs.
"U.S. Appl. No. 14/034,464, Notice of Allowance mailed Oct. 7, 2014", 11 pgs.
"U.S. Appl. No. 14/034,464, Notice of Non-Compliant Amendment mailed Apr. 10, 2014", 2 pgs.
"U.S. Appl. No. 14/034,464, Preliminary Amendment filed Oct. 18, 2013", 8 pgs.
"U.S. Appl. No. 14/034,464, Response filed Apr. 1, 2014 to Non Final Office Action mailed Jan. 3, 2014", 12 pgs.
"U.S. Appl. No. 14/034,464, Response filed May 12, 2014 to Non-Compliant Amendment mailed Apr. 10, 2014", 7 pgs.
"U.S. Appl. No. 14/034,464, Response filed Sep. 11, 2014 to Final Office Action mailed Jun. 11, 2014.", 12 pgs.
"U.S. Appl. No. 14/034,469, Examiner Interview Summary mailed Apr. 4, 2014", 3 pgs.
"U.S. Appl. No. 14/034,469, Examiner Interview Summary mailed Aug. 6, 2014", 3 pgs.
"U.S. Appl. No. 14/034,469, Final Office Action mailed May 2, 2014", 12 pgs.
"U.S. Appl. No. 14/034,469, Non Final Office Action mailed Jan. 22, 2014", 11 pgs.
"U.S. Appl. No. 14/034,469, Notice of Allowance mailed Sep. 26, 2014", 5 pgs.
"U.S. Appl. No. 14/034,469, Preliminary Amendment filed Oct. 18, 2013", 8 pgs.
"U.S. Appl. No. 14/034,469, Response filed Apr. 9, 2014 to Non Final Office Action mailed Jan. 22, 2014", 12 pgs.
"U.S. Appl. No. 14/034,469, Response filed Aug. 19, 2014 to Final Office Action mailed May 2, 2014", 10 pgs.
"U.S. Appl. No. 14/034,476, Examiner Interview Summary mailed Apr. 4, 2014", 3 pgs.
"U.S. Appl. No. 14/034,476, Examiner Interview Summary mailed Aug. 4, 2014", 3 pgs.
"U.S. Appl. No. 14/034,476, Final Office Action mailed May 1, 2014", 15 pgs.
"U.S. Appl. No. 14/034,476, Non Final Office Action mailed Jan. 6, 2014", 13 pgs.
"U.S. Appl. No. 14/034,476, Notice of Allowance mailed Sep. 15, 2014", 12 pgs.
"U.S. Appl. No. 14/034,476, Preliminary Amendment filed Oct. 18, 2013", 9 pgs.
"U.S. Appl. No. 14/034,476, Response filed Apr. 7, 2014 to Non Final Office Action mailed Jan. 6, 2014", 11 pgs.
"U.S. Appl. No. 14/034,476, Response filed Aug. 19, 2014 to Final Office Action mailed May 1, 2014", 11 pgs.
"U.S. Appl. No. 14/034,481, Examiner Interview Summary mailed Apr. 4, 2014", 3 pgs.
"U.S. Appl. No. 14/034,481, Examiner Interview Summary mailed Aug. 4, 2014", 3 pgs.
"U.S. Appl. No. 14/034,481, Final Office Action mailed Apr. 30, 2014", 15 pgs.
"U.S. Appl. No. 14/034,481, Non Final Office Action mailed Jan. 9, 2014", 14 pgs.
"U.S. Appl. No. 14/034,481, Notice of Allowance mailed Sep. 24, 2014", 11 pgs.
"U.S. Appl. No. 14/034,481, Preliminary Amendment filed Oct. 18, 2013", 8 pgs.
"U.S. Appl. No. 14/034,481, Response filed Apr. 8, 2014 to Non Final Office Action mailed Jan. 9, 2014", 13 pgs.
"U.S. Appl. No. 14/034,481, Response filed Jul. 30, 2014 to Final Office Action mailed Apr. 30, 2014", 10 pgs.
"U.S. Appl. No. 14/034,483, Examiner Interview Summary mailed May 5, 2014", 3 pgs.
"U.S. Appl. No. 14/034,483, Examiner Interview Summary mailed Aug. 8, 2014", 3 pgs.
"U.S. Appl. No. 14/034,483, Final Office Action mailed Jun. 4, 2014", 12 pgs.
"U.S. Appl. No. 14/034,483, Non Final Office Action mailed Feb. 5, 2014", 12 pgs.
"U.S. Appl. No. 14/034,483, Notice of Allowance mailed Sep. 29, 2014", 12 pgs.
"U.S. Appl. No. 14/034,483, Preliminary Amendment filed Oct. 18, 2013", 8 pgs.
"U.S. Appl. No. 14/034,483, Response filed May 5, 2014 to Non Final Office Action mailed Feb. 5, 2014", 12 pgs.
"U.S. Appl. No. 14/034,483, Response filed Aug. 20, 2014 to Final Office Action mailed Jun. 4, 2014", 11 pgs.
"U.S. Appl. No. 14/035,271, Examiner Interview Summary mailed Jun. 2, 2014", 3 pgs.
"U.S. Appl. No. 14/035,271, Non Final Office Action mailed Feb. 28, 2014", 11 pgs.
"U.S. Appl. No. 14/035,271, Notice of Allowance mailed Sep. 12, 2014", 12 pgs.
"U.S. Appl. No. 14/035,271, Preliminary Amendment filed Nov. 13, 2013", 8 pgs.
"U.S. Appl. No. 14/035,271, Response filed May 28, 2014 to Non Final Office Action mailed Feb. 28, 2014", 13 pages.
"U.S. Appl. No. 14/035,291, Examiner Interview Summary mailed May 6, 2014", 3 pgs.
"U.S. Appl. No. 14/035,291, Non Final Office Action mailed Feb. 13, 2014", 11 pgs.
"U.S. Appl. No. 14/035,291, Notice of Allowance mailed Jun. 13, 2014", 13 pgs.
"U.S. Appl. No. 14/035,291, Preliminary Amendment filed Nov. 13, 2013", 8 pgs.
"U.S. Appl. No. 14/035,291, Response filed May 13, 2014 to Non Final Office Action mailed Feb. 13, 2014", 12 pgs.
"U.S. Appl. No. 14/035,306, Examiner Interview Summary mailed Jun. 3, 2014", 3 pgs.
"U.S. Appl. No. 14/035,306, Examiner Interview Summary mailed Sep. 4, 2014", 3 pgs.
"U.S. Appl. No. 14/035,306, Final Office Action mailed Jun. 27, 2014", 12 pgs.
"U.S. Appl. No. 14/035,306, Non Final Office Action mailed Mar. 3, 2014", 12 pgs.
"U.S. Appl. No. 14/035,306, Notice of Allowance mailed Oct. 16, 2014", 12 pgs.
"U.S. Appl. No. 14/035,306, Preliminary Amendment filed Oct. 24, 2013", 9 pgs.
"U.S. Appl. No. 14/035,306, Response filed May 29, 2014 to Final Office Action mailed Mar. 3, 2014", 12 pgs.
"U.S. Appl. No. 14/035,306, Response filed Sep. 25, 2014 to Final Office Action mailed Jun. 27, 2014", 12 pgs.

(56) References Cited

OTHER PUBLICATIONS

"U.S. Appl. No. 14/035,333, Examiner Interview Summary mailed Mar. 4, 2015", 3 pgs.
"U.S. Appl. No. 14/035,333, Examiner Interview Summary mailed May 6, 2014", 3 pgs.
"U.S. Appl. No. 14/035,333, Examiner Interview Summary mailed Aug. 11, 2014", 3 pgs.
"U.S. Appl. No. 14/035,333, Final Office Action mailed Jan. 29, 2015", 7 pgs.
"U.S. Appl. No. 14/035,333, Final Office Action mailed Jun. 2, 2014", 13 pgs.
"U.S. Appl. No. 14/035,333, Non Final Office Action mailed Feb. 20, 2014", 12 pgs.
"U.S. Appl. No. 14/035,333, Non Final Office Action mailed Oct. 9, 2014", 13 pgs.
"U.S. Appl. No. 14/035,333, Notice of Allowance mailed Mar. 23, 2015", 11 pgs.
"U.S. Appl. No. 14/035,333, Preliminary Amendment filed Oct. 18, 2013", 8 pgs.
"U.S. Appl. No. 14/035,333, Response filed Jan. 6, 2015 to Non Final Office Action mailed Oct. 9, 2014", 12 pgs.
"U.S. Appl. No. 14/035,333, Response filed Mar. 3, 2015 to Final Office Action mailed Jan. 29, 2015", 7 pgs.
"U.S. Appl. No. 14/035,333, Response filed May 20, 2014 to Non Final Office Action mailed Feb. 20, 2014", 11 pgs.
"U.S. Appl. No. 14/035,333, Response filed Aug. 20, 2014 to Final Office Action mailed Jun. 2, 2014", 11 pgs.
"U.S. Appl. No. 14/035,333, Supplemental Amendment filed Sep. 25, 2014", 7 pgs.
"U.S. Appl. No. 14/035,347, Examiner Interview Summary mailed Jun. 3, 2014", 3 pgs.
"U.S. Appl. No. 14/035,347, Non Final Office Action mailed Feb. 27, 2014", 11 pgs.
"U.S. Appl. No. 14/035,347, Notice of Allowance mailed Jul. 9, 2014", 12 pgs.
"U.S. Appl. No. 14/035,347, Preliminary Amendment filed Oct. 23, 2013", 8 pgs.
"U.S. Appl. No. 14/035,347, Response filed May 27, 2014 to Non Final Office Action mailed Feb. 27, 2014", 11 pgs.
"U.S. Appl. No. 14/036,769, Examiner Interview Summary mailed May 5, 2014", 3 pgs.
"U.S. Appl. No. 14/036,769, Examiner Interview Summary mailed Aug. 8, 2014", 3 pgs.
"U.S. Appl. No. 14/036,769, Final Office Action mailed May 16, 2014", 12 pgs.
"U.S. Appl. No. 14/036,769, Non Final Office Action mailed Jan. 31, 2014", 11 pgs.
"U.S. Appl. No. 14/036,769, Notice of Allowance mailed Sep. 12, 2014", 9 pgs.
"U.S. Appl. No. 14/036,769, Preliminary Amendment filed Nov. 8, 2013", 8 pgs.
"U.S. Appl. No. 14/036,769, Response filed Apr. 30, 2014 to Non Final Office Action mailed Jan. 31, 2014", 11 pgs.
"U.S. Appl. No. 14/036,769. Response filed Aug. 15, 2014 to Final Office Action mailed May 16, 2014", 12 pgs.
"U.S. Appl. No. 14/036,796, Examiner Interview Summary mailed Jun. 9, 2014", 3 pgs.
"U.S. Appl. No. 14/036,796, Non Final Office Action mailed Mar. 10, 2014", 12 pgs.
"U.S. Appl. No. 14/036,796, Notice of Allowance mailed Jun. 30, 2014", 12 pgs.
"U.S. Appl. No. 14/036,796, Preliminary Amendment filed Oct. 8, 2013", 9 pgs.
"U.S. Appl. No. 14/036,796, Response filed Jun. 10, 2014 to Non Final Office Action mailed Mar. 10, 2014", 14 pgs.
"U.S. Appl. No. 14/036,816, Examiner Interview Summary mailed Jun. 9, 2014", 3 pgs.
"U.S. Appl. No. 14/036,816, Non Final Office Action mailed Mar. 12, 2014", 13 pgs.
"U.S. Appl. No. 14/036,816, Notice of Allowance mailed Sep. 5, 2014", 13 pgs.
"U.S. Appl. No. 14/036,816, Preliminary Amendment filed Oct. 23, 2013", 8 pgs.
"U.S. Appl. No. 14/036,816, Response filed Jun. 12, 2014 to Non Final Office Action mailed Mar. 12, 2014", 12 pgs.
"U.S. Appl. No. 14/036,832, Examiner Interview Summary May 5, 2014", 3 pgs.
"U.S. Appl. No. 14/036,832, Non Final Office Action mailed Feb. 5, 2014", 14 pgs.
"U.S. Appl. No. 14/036,832, Notice of Allowance mailed Jul. 9, 2014", 11 pgs.
"U.S. Appl. No. 14/036,832, Preliminary Amendment filed Nov. 8, 2013", 10 pgs.
"U.S. Appl. No. 14/036,832, Response filed May 5, 2014 to Non Final Office Action mailed Feb. 5, 2014", 14 pgs.
"U.S. Appl. No. 14/036,848, Examiner Interview Summary mailed Feb. 11, 2015", 3 pgs.
"U.S. Appl. No. 14/036,848, Examiner Interview Summary mailed Apr. 22, 2014", 3 pgs.
"U.S. Appl. No. 14/036,848, Final Office Action mailed Jun. 11, 2014", 11 pgs.
"U.S. Appl. No. 14/036,848, Final Office Action mailed Dec. 22, 2014", 10 pgs.
"U.S. Appl. No. 14/036,848, Non Final Office Action mailed Jan. 21, 2014", 9 pgs.
"U.S. Appl. No. 14/036,848, Notice of Allowance mailed Apr. 28, 2015", 7 pgs.
"U.S. Appl. No. 14/036,848, Preliminary Amendment filed Nov. 8, 2013", 8 pgs.
"U.S. Appl. No. 14/036,848, Response filed Apr. 21, 2014 to Non Final Office Action mailed Jan. 21, 2014", 8 pgs.
"U.S. Appl. No. 14/036,848, Response filed Mar. 2, 2015 to Final Office Action mailed Dec. 22, 2014", 8 pgs.
"U.S. Appl. No. 14/036,848. Response filed Sep. 11, 2014 to Final Office Action mailed Jun. 11, 2014.", 10 pgs.
"U.S. Appl. No. 14/036,871, Examiner Interview Summary mailed Feb. 26, 2015", 3 pgs.
"U.S. Appl. No. 14/036,871, Examiner Interview Summary mailed Apr. 17, 2014", 3 pgs.
"U.S. Appl. No. 14/036,871, Examiner Interview Summary mailed Aug. 19, 2014", 3 pgs.
"U.S. Appl. No. 14/036,871, Final Office Action mailed May 27, 2014", 13 pgs.
"U.S. Appl. No. 14/036,871, Non Final Office Action mailed Jan. 10, 2014", 12 pgs.
"U.S. Appl. No. 14/036,871, Non Final Office Action mailed Dec. 22, 2014", 11 pgs.
"U.S. Appl. No. 14/036,871, Notice of Allowance mailed Apr. 29, 2015", 7 pgs.
"U.S. Appl. No. 14/036,871, Preliminary Amendment filed Nov. 13, 2013", 8 pgs.
"U.S. Appl. No. 14/036,871, Response filed Apr. 10, 2014 to Non Final Office Action mailed Jan. 10, 2014", 16 pgs.
"U.S. Appl. No. 14/036,871. Response filed Aug. 27, 2014 to Final Office Action mailed May 27, 2014.", 12 pgs.
"U.S. Appl. No. 14/675,503, Non Final Office Action mailed Aug. 20, 2015", 15 pgs.
"U.S. Appl. No. 14/675,503, Preliminary Amendment filed Jun. 17, 2015", 8 pgs.
"U.S. Appl. No. 14/675,512, Non Final Office Action mailed May 13, 2015", 11 pgs.
"U.S. Appl. No. 14/675,512, Response filed Aug. 11, 2015 to Non Final Office Action mailed May 13, 2015", 10 pgs.
"U.S. Appl. No. 14/754,562, Preliminary Amendment filed Jul. 8, 2015", 7 pgs.
"U.S. Appl. No. 14/754,582, Preliminary Amendment filed Jul. 7, 2015", 8 pgs.
"U.S. Appl. No. 14/754,597, Preliminary Amendment filed Jul. 8, 2015", 9 pgs.
"U.S. Appl. No. 14/754,601, Preliminary Amendment filed Jul. 8, 2015", 10 pgs.

(56) References Cited

OTHER PUBLICATIONS

"U.S. Appl. No. 14/825,929, Preliminary Amendment filed Aug. 18, 2015", 11 pgs.
"U.S. Appl. No. 14/825,943, Preliminary Amendment filed Aug. 18, 2015", 10 pgs.
"U.S. Appl. No. 14/825,958, Preliminary Amendment filed Aug. 18, 2015", 10 pgs.
"U.S. Appl. No. 14/825,974, Preliminary Amendment filed Aug. 18, 2015", 10 pgs.
"U.S. Appl. No. 14/825,985, Preliminary Amendment filed Aug. 18, 2015", 10 pgs.
"U.S. Appl. No. 14/036,871, Response filed Mar. 23, 2015 to Non Final Office Action mailed Dec. 22, 2014", 9 pgs.
"European Application Serial No. 12760367.8, Extended European Search Report mailed Jun. 3, 2015", 6 pgs.
"European Application Serial No. 12760367.8, Office Action mailed May 6, 2014", 3 pgs.
"European Application Serial No. 12760367.8, Response filed Nov. 11, 2014", 13 pgs.
"European Application Serial No. 12834085.8, Extended European Search Report mailed Feb. 6, 2015", 6 pgs.
"European Application Serial No. 12834085.8, Office Action mailed Feb. 21, 2014", 3 pgs.
"European Application Serial No. 12834085.8, Response filed Aug. 13, 2014 to Office Action mailed Feb. 21, 2014", 11 pgs.
"International Application Serial No. PCT/US2012/030115, International Preliminary Report on Patentability mailed Mar. 27, 2014", 10 pgs.
"International Application Serial No. PCT/US2012/030115, International Search Report mailed Jun. 20, 2012", 4 pgs.
"International Application Serial No. PCT/US2012/030115, Written Opinion mailed Jun. 20, 2012", 8 pgs.
"International Application Serial No. PCT/US2012/056531, International Preliminary Report on Patentability mailed Apr. 3, 2014", 8 pgs.
"International Application Serial No. PCT/US2012/056531, International Search Report mailed Nov. 29, 2012", 2 pgs.
"International Application Serial No. PCT/US2012/056531, Written Opinion mailed Nov. 29, 2012", 6 pgs.
Mallet, Vincent, et al., "Sharing Content Among Multiple Devices", U.S. Appl. No. 61/466,849, filed Mar. 23, 2011, 81 pgs.
Mallet, Vincent, et al., "User Interface for Displaying User Affinity Graphically", U.S. Appl. No. 13/398,445, filed Feb. 16, 2012, 93 pgs.
"U.S. Appl. No. 14/675,512, Examiner Interview Summary mailed May 31, 2016", 3 pgs.
"U.S. Appl. No. 14/675,512, Final Office Action mailed Mar. 17, 2016", 20 pgs.
"U.S. Appl. No. 14/675,512, Notice of Allowance mailed Jun. 24, 2016", 23 pgs.
"U.S. Appl. No. 14/675,512, Response filed May 27, 2016 to Final Office Action mailed Mar. 17, 2016", 14 pgs.
"U.S. Appl. No. 14/754,562, Non Final Office Action mailed Jun. 6, 2016", 15 pgs.
"U.S. Appl. No. 14/754,582, Non Final Office Action mailed May 5, 2016", 10 pgs.
"U.S. Appl. No. 14/754,582, Response filed Jul. 25, 2016 to to Non Final Office Action mailed May 5, 2016", 7 pgs.
"Application U.S. Appl. No. 14/754,597, Notice of Allowance mailed Apr. 5, 2016", 12 pgs.
"Application U.S. Appl. No. 14/754,601, Notice of Allowance mailed Apr. 5, 2016", 10 pgs.
"Chinese Application Serial No. 201280032937.6, Office Action mailed Apr. 26, 2016", with English translation of claims, 41 pgs.
"European Application Serial No. 12834085.8, Response filed Sep. 7, 2015", 22 pgs.
"U.S. Appl. No. 14/754,562, Examiner Interview Summary mailed Jan. 26, 2017", 3 pgs.
"U.S. Appl. No. 14/754,562, Examiner Interview Summary mailed Aug. 19, 2016", 3 pgs.
"U.S. Appl. No. 14/754,562, Final Office Action mailed Oct. 20, 2016", 13 pgs.
"U.S. Appl. No. 14/754,562, Response filed Jan. 20, 2017 to Final Office Action mailed Oct. 20, 2016", 8 pgs.
"U.S. Appl. No. 14/754,562, Response filed Sep. 1, 2016 to Non Final Office Action mailed Jun. 6, 2016", 8 pgs.
"U.S. Appl. No. 14/754,582, Notice of Allowance mailed Aug. 22, 2016", 11 pgs.
"U.S. Appl. No. 14/825,929, Notice of Allowance mailed Jan. 10, 2017", 19 pgs.
"U.S. Appl. No. 14/825,943, Notice of Allowance mailed Jan. 11, 2017", 18 pgs.
"U.S. Appl. No. 14/825,943, PTO Response to Rule 312 Communication mailed Jan. 23, 2017", 1 pg.
"U.S. Appl. No. 14/825,958, Non Final Office Action mailed Jan. 17, 2017", 15 pgs.
"U.S. Appl. No. 14/825,974, Non Final Office Action mailed Jan. 9, 2017", 14 pgs.
"U.S. Appl. No. 14/825,985, Non Final Office Action mailed Jan. 11, 2017", 14 pgs.
"Chinese Application Serial No. 201280024677.8, Office Action mailed Sep. 2, 2016", with English Translation of claims, 28 pgs.
"Chinese Application Serial No. 201280024677.8, Response filed Jan. 16, 2017 to Office Action mailed Sep. 2, 2016", With English Translation of Claims, 67 pgs.
"Chinese Application Serial No. 201280032937.6, Office Action mailed Dec. 2, 2016", (With English Translation), 20 pgs.
"Chinese Application Serial No. 201280032937.6, Response filed Sep. 8, 2016 to Office Action mailed Apr. 26, 2016", with English Translation of Claims, 9 pgs.

\* cited by examiner

MEASURING AFFINITY LEVELS VIA PASSIVE AND ACTIVE INTERACTIONS

CROSS-REFERENCE TO RELATED PATENT DOCUMENTS

This patent application is a continuation of and claims the benefit of priority to U.S. patent application Ser. No. 13/887,529, filed May 6, 2013, now U.S. Pat. No. 9,071,509, issued Jun. 30, 2015, which is a continuation of and claims the benefit of priority to U.S. patent application Ser. No. 13/404,381, filed on Feb. 24, 2012, now U.S. Pat. No. 8,539,086, issued Sep. 17, 2013, which claims the benefit of priority to U.S. Provisional Patent Application Ser. No. 61/466,849, entitled "SHARING CONTENT AMONG MULTIPLE DEVICES," filed Mar. 23, 2011, the benefit of priority of each of which is claimed hereby, and each of which are incorporated by reference herein in its entirety.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent files or records, but otherwise reserves all copyright rights whatsoever. The following notice applies to the software and data as described below and in the drawings that form a part of this document: Copyright 2012, Color Labs, Inc. All Rights Reserved.

TECHNICAL FIELD

This application relates generally to user devices and, more specifically, to systems and methods for forming user device groups.

BACKGROUND

As portable communication devices, such as cellular phones, tablet computers, and laptop computers, continue to evolve to provide improved audio, video, and still image capture capability, the opportunity for users of these devices to capture various forms of content and share that content with others, such as friends and relatives, continues to increase. In some situations, a user may distribute the content to others by way of explicitly determining the recipients of the content, manually attaching the content to an e-mail, "picture mail," or similar communication message, and transmitting the message and attached content using the communication device of the user to the communication devices of each of the recipients. Typically, the user distributing the content has programmed the contact information, such as an e-mail address or telephone number, of each of the recipients into his communication device prior to capturing the content to be distributed.

In another example, the user distributing the content may post the content to a separate Internet website or other data site accessible by the intended recipients of the content, and subsequently inform the recipients of the message as to how to access the content. Typically, the site providing access to the content is password-protected or provides some other means by which only the intended recipients may access the content.

BRIEF DESCRIPTION OF THE DRAWINGS

Some embodiments are illustrated by way of example and not limitation in the figures of the accompanying drawings in which.

DETAILED DESCRIPTION

Example methods and systems for the forming of user device groups, such as device groups formed primarily for the sharing of content, including, for example, photographs, audio content, video content, and textual content, are discussed. In the following description, for purposes of explanation, numerous specific details are set forth in order to provide a thorough understanding of example embodiments. It will be evident, however, to one skilled in the art that the present subject matter may be practiced without these specific details. It will also be evident that the types of software development described herein are not limited to the examples provided and may include other scenarios not specifically discussed.

Figure 1:
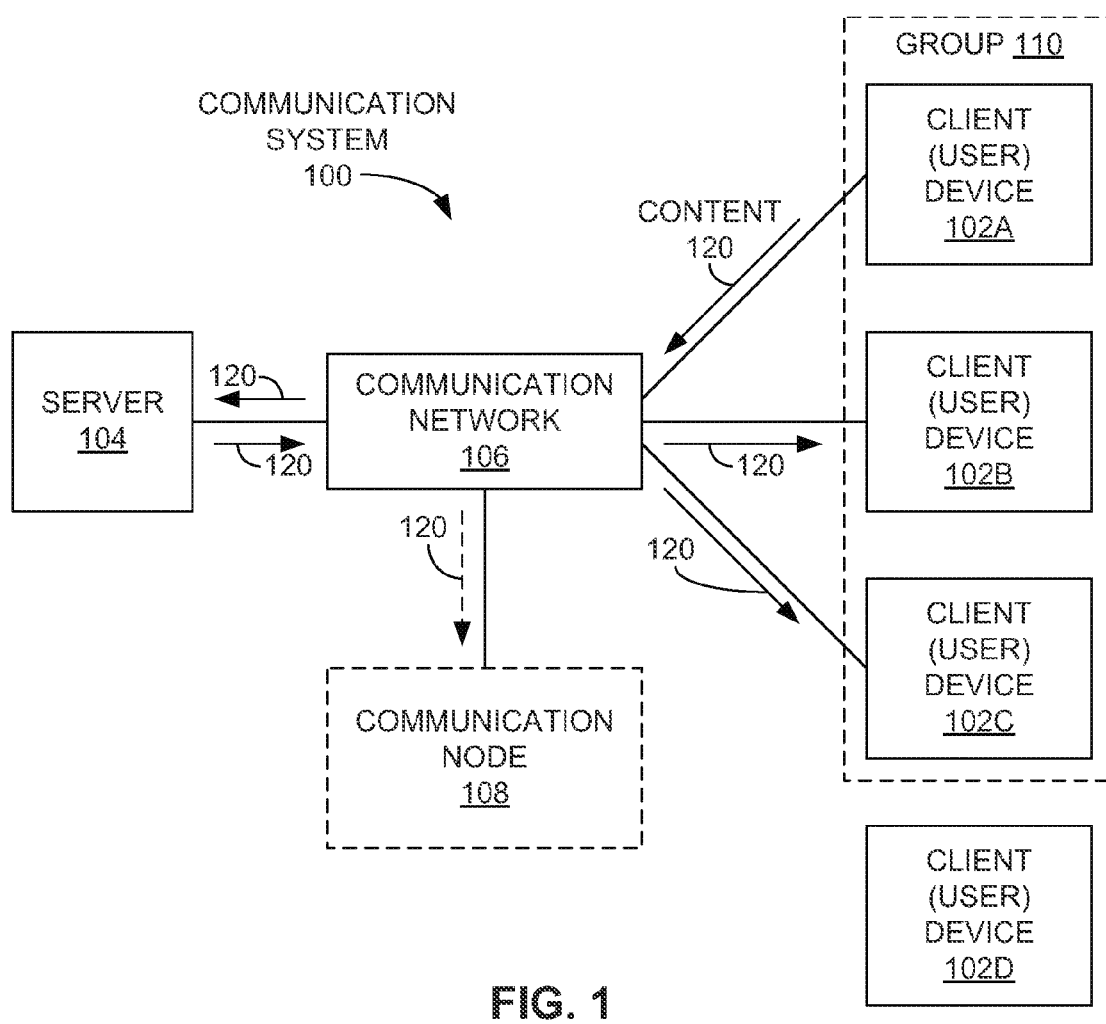
FIG. 1 is a block diagram illustrating an example communication system.

In accordance with an example embodiment, FIG. 1 illustrates a communication system 100 including multiple client (user) devices 102A, 102B, 102C, 102D (more generally, devices 102) coupled with a server 104 via a communication network 106. In this specific example, three of the client devices 102A, 102B, 102C belong to a group 110 for which the server 104 distributes content 120 captured by one of the group client devices 102A, 102B, 102C to the remaining members of the group 110. In this implementation, a fourth client device 102D does not belong to the group 110, and thus does not receive the content 120 posted to the group 110 by any of the group client devices 102A, 102B, 102C. While FIG. 1 displays a group 110 of three member client devices 102A, 102B, 102C, any number of client devices 102 greater than one may constitute a group 110. As is described in greater detail below, the member client devices 102 of the group 110 may be determined by way of interactions between the client devices 102, such as communications between the devices 102, the physical proximity of the devices 102, and other parameters describing how closely or strongly the client devices 102 may be logically connected or related to each other during a period of time.

Figure 2:
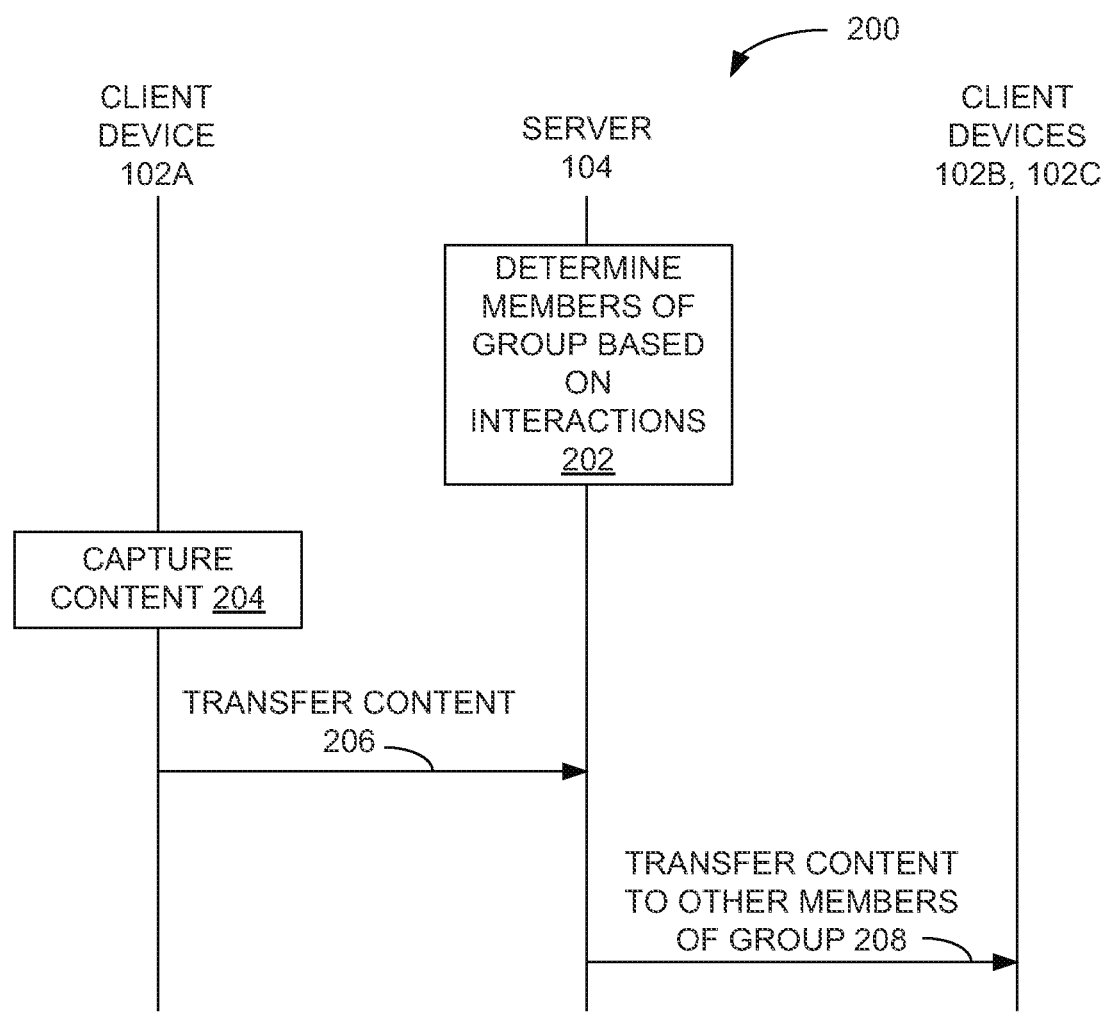
FIG. 2 is a flow diagram illustrating an example method of sharing content in the communication system of FIG. 1.

FIG. 2 is a simplified flow diagram of an example method 200 of sharing content 120 among client devices 102, as shown in FIG. 1. However, other communication systems utilizing different components or systems may employ the method depicted in FIG. 2 in other examples. In the method 200, the server 104 determines the client devices 102 belonging to the group 110 (operation 202), as mentioned above. One of the client devices 102A of the group 110 may then capture the content 120 (operation 204), such as audio, video, still image, or the like. The client device 102A then transfers the content 120 to the server 104 (operation 206), which transfers the content 120 to the other member client devices 102B, 102C of the group 110 (operation 208). In one example, the content 120 may also be distributed to a separate communication node 108 (shown in FIG. 1) via an Application Programming Interface (API) of the node 108 so that the content 120 may be accessed from other devices as well. Examples of the communication node 108 may be a server hosting a particular website or messaging service, such as Shutterfly® or Twitter®.

In another example, the method 200 may be encoded as instructions on a non-transitory computer-readable storage medium, such as, for example, an integrated circuit, magnetic disk, or optical disk, which are readable and executable by one or more computers or other processing systems, such as the client devices 102 and the server 104 of FIG. 1.

In FIG. 1, the client devices 102 are capable of capturing content 120, such as photographs, audio and/or video, textual data (such as that generated by a user of the device), or any other type of content 120 of interest to one or more users, and displaying that content 120 to the user of the device 102. Examples of the client devices 102 may include, but are not limited to, mobile communication devices, such as cellular phones, personal digital assistants (PDAs), digital cameras, laptop computers, tablet computers, and netbooks.

The communication network 106 may be any communication network capable of facilitating communications, including the transfer of the content 120, either by wire or wirelessly, between the client devices 102 and the server 104. Examples of the communication network 106 may include, but are not limited to, any and/or all of a wide-area network (such as the Internet), a local-area network (LAN) (such as an IEEE 802.11x (Wi-Fi) network), a Bluetooth connection, a Near Field Communication (NFC) connection, an Ethernet connection, a mobile or cellular communications device network (such as a third generation (3G) or fourth generation (4G) connection), and a microcell network. The communication network 106 may constitute a direct connection between the server 104 and each of the client devices 102, or may include any number of transmitters, receivers, switches, repeaters, and other components to facilitate communications between the server 104 and the client devices 102.

The server 104 may be any device or system capable of receiving the content 120 from the client devices 102, forwarding the content 120 to other client devices 102, and performing other tasks associated with the server 104 as further described below. The server 104 may be, for example, a processor-based system programmed to coordinate the forming of a group 110 of client devices 102 and facilitating the transfer of the content 120 generated by one or more member devices 102 of the group 110 to other members of the group 110. In one example, the server 104 may implemented as one or more components, such as a processing system and associated database, possibly embodied as a "cloud" solution accessible via the communication network 106. In another example, the server 104 may be a system or device deployed at a communication service provider site, a conference center, or a location at which a particular event or meeting is taking place. In some implementations, the server 104 may be combined with one or more components of the communication network 106, or devices attached thereto, such as a wireless or microcell access point, a localized hub, or even one of the client devices 102. For example, instead of using an explicit client-server topology, the communication system 100 may be configured as a peer-to-peer network, with one or more of the client devices 102 performing the duties of the server 104 as described herein.

In some embodiments, the client device group 110 represents a number of client devices 102 that are identified by way of "interactions" detected by the server 104 that occur between the member devices 102. Interactions between client devices 102 may be both passive (for example, client devices 102 left in close proximity to each other for periods of time) and active (for example, a call, SMS message, or other communication initiated from one client device 102 to another). Types of interactions between client devices 102 that may cause them to be identified with the same group 110 may include, but are not limited to, the number of communications that have occurred between the client devices 110, the length of time of the communications between the client devices 102, the physical distance between the client devices 102, a length of time during which the client devices 102 are in close physical proximity, and other circumstances and/or activities involving the client devices 102. In some implementations, two client devices 102 of the same group 110 need not maintain close proximity or engage in direct communications between the devices 102 if some type of logical interaction of a unique or important character between the two devices 102 is occurring, or has occurred. For examples, client devices 102 whose users have identified each other as "friends," and thus may have communicated directly and extensively in the past, may belong to a group 110 regardless of the physical proximity of the associated client devices 102. Such friends may include, but are not limited to, personal friends, friends of friends, relatives, and users sharing or holding one or more common interests or backgrounds. Such logical interactions, together with the more explicit interactions between users mentioned above, may be considered interactions or logical relationships between the various users or user devices for the purpose of defining the client device group 110 in some examples.

Any or all of these interactions, as detected by, or communicated to, the server 104 may contribute to the server 104 determining or calculating a "connection strength" or "affinity" between two of the client devices 102. In some examples, client devices 102 exhibiting a relatively higher connection strength or affinity tend to indicate that the devices 102 should be identified with, or be members of, a group 110, while a relatively lower connection strength or affinity between client devices 102 tends to indicate that the devices 102 should not be members of the same group 110. In at least some embodiments, since the server 104 may detect or receive information regarding interactions between client devices 102, as described above, the focus of the information describing the interactions may be on the client devices 102 themselves, and not on the users of the client devices 102. As a result, the server 104 need not collect personally identifiable information of any users of the client devices 102 in order to determine or calculate the connection strength or affinity between any two client devices 102. Personally identifiable information would normally include sensitive information such as full name, driver's license number, credit card account numbers, and the like.

Additionally, since the server 104 may join client devices 102 into a group on the basis of client device 102 interactions, explicit guidance from users regarding which client devices 102 to include in a network or group 110 may be unnecessary. Further, the server 104 may construct the group 110 and manage membership of client devices 102 in the group 110 without any formalized client device 102 authentication process, such as the explicit use of passwords or other security measures.

In some examples, the connection strength or affinity between two or more client devices 102 may not remain constant over time. For example, two users capturing photographs with their respective client devices at a particular event may never communicate directly with each other, and may not be present at any other location at the same time for any significant length of time. As a result, the server 104 may treat such a connection between the two client devices 102 as temporary or "ephemeral," thus causing the two client devices 102 to be associated with the same group 110 for a brief time period. Thus, membership in a group 110 may wax and wane over time, and even the group 110 may be short-lived. Thus, such a group 110 may be considered a kind of "elastic network" or "dynamic network" in which membership may change over time due to continuing interactions (or lack thereof) between client devices 102 within the group 110, as well as external to the group 110. In this case, the term "network" is employed to refer to the group 110 of client devices 102, as described above.

In one embodiment, once the server 104 forms a group 110 of client devices 102, any member of the group 110 may post content 120, such as audio, video, text, still images, and the like, to the server 104, which may then distribute the content 120 to the other members of the group 110. In the specific example of FIG. 1, the server 104 has formed the group 110 including a first client device 102A, a second client device 102B, and a third client device 102C. A fourth client device 102D is not included in the group 102D due to not possessing a connection strength or affinity comparable to the connection strength or affinity between the other client devices 102A, 102B, 102C. When the first client device 102A then posts content 120 to the server 104 via the communication network 106, the server 104, in turn, forwards the content 120 to all other members of the group 110 (in this case, the second client device 102B and the third client device 102C), but not to those client devices 102 that are not members of the group 110 (in this example, the fourth client device 102D). Similarly, the server 104 may distribute content posted by the second client device 102B or the third client device 102C to the other members of the group 110.

Figure 3:
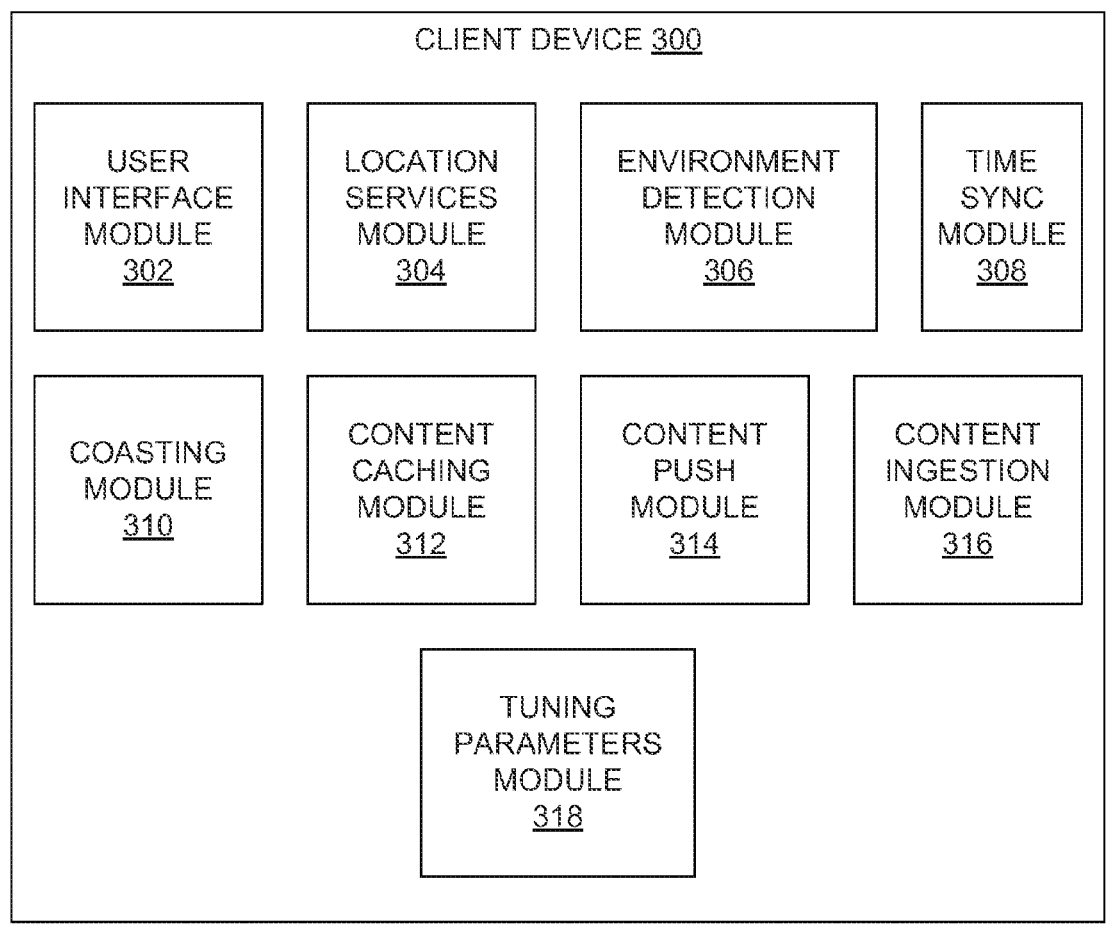
FIG. 3 is a block diagram illustrating modules of an example client device of an example communication system.
Figure 4:
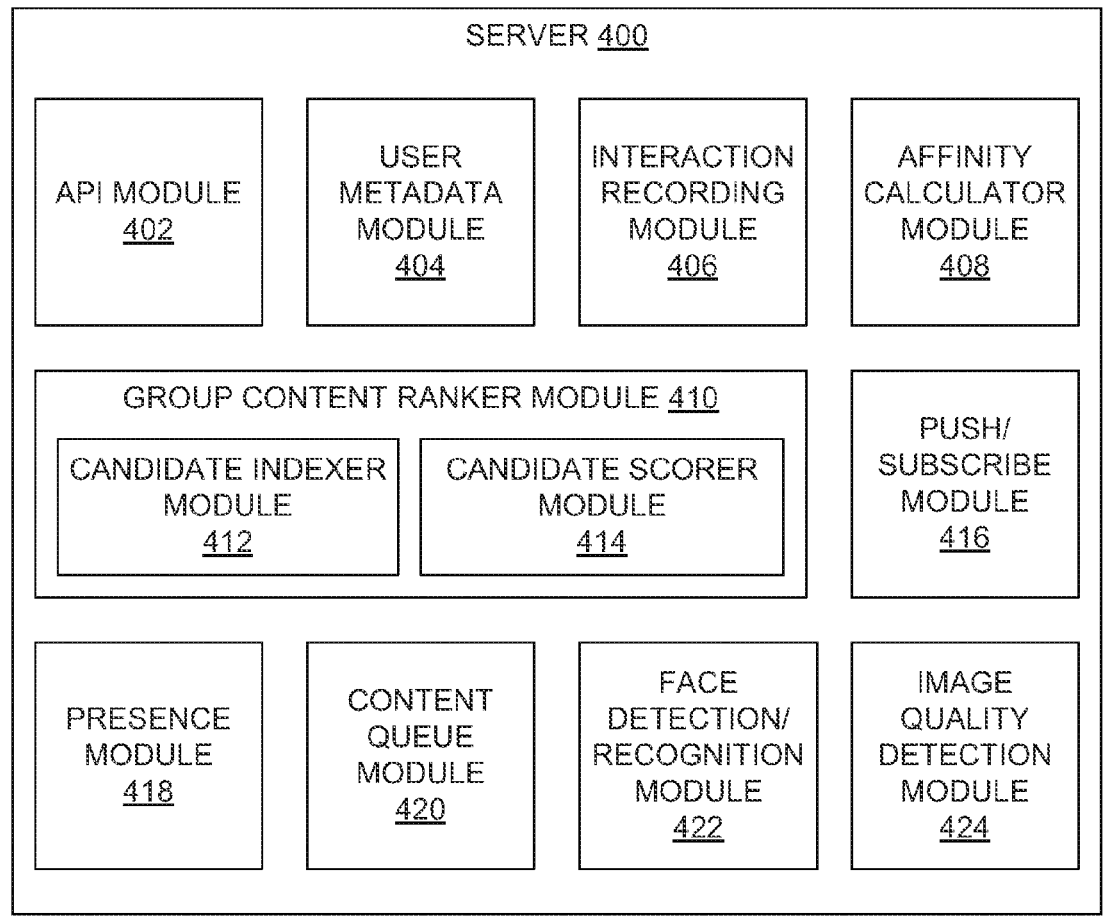
FIG. 4 is a block diagram illustrating modules of an example server of an example communication system.

FIGS. 3 and 4 are block diagrams of example embodiments of a client device 300 and associated server 400, respectively, which may serve as one of the client devices 102 and the server 104 depicted in FIG. 1. In FIG. 3, the client device 300 includes a number of software and or hardware modules, such as a user interface module 302, a location services module 304, an environment detection module 306, a time synchronization module 308, a coasting module 310, a content caching module 312, a content push mechanism module 314, a content ingestion module 316, and a tuning parameters module 318. In other client devices 300, one or more of the modules 302-318 may be omitted, and one or more modules not depicted in FIG. 3 may be included.

In the client device 300, the user interface module 302 may facilitate access of the user of the client device 300 to various aspects of the sharing of content 120 within a group 110, including, but not limited to, providing explicit input as to which group 110 to join, posting content 120 to the group 110, and receiving content 120 posted by other client devices 102 in the group 110. More specific examples of the user interface provided by the user interface module 302 are discussed in greater detail below in conjunction with FIGS. 9A through 9L.

The location services module 304 may provide or generate information regarding the physical location of the user client device 300. In one example, the location service module 304 may determine location by way of signals received from the GPS system, an Assisted GPS (A-GPS) system, a Wi-Fi Positioning System, and/or cell-site triangulation. The location services module 304 may receive such signals by way of circuitry of the client device 300 and process one or more of the signals to determine the location.

The environment detection module 306 may receive signals from one or more sensors residing on, or in communication with, the client device 300 to indicate various environmental conditions in the vicinity of the client device 300. Such signals may indicate, for example, atmospheric pressure, temperature, light, velocity, acceleration, orientation, and so on, as generated by sensors such as light meters, accelerometers, gyroscopes, thermometers, and the like. For example, persistent changes in acceleration may indicate the client device is located in a moving car, or the detection of multiple voices may indicate presence within a crowd. The environment detection module 306 may also employ signals from various communication network interfaces, such as Near-Field Communication (NFC) signals, Bluetooth® communication signals, Wi-Fi communication signals, and the like to supplement and enhance the location information of the client device 300 generated by the location services module 306 to more closely define the location of the client device 300.

The time synchronization module 308 may provide timing information, such as a timestamp, that is periodically received from the server 400 (and maintained locally in the time synchronization module 308) to mark when various location data (from the location services module 304) and/or environmental data (from by the environment detection module 306) were received or generated. As is described more fully below, the location and environmental data, along with their timing information, may be uploaded to the server 400, which may then compare that data with corresponding data from other client devices 300 to determine the relative physical proximity of the client devices 300, and thus at least partially determine which of the client devices 300 may be grouped together.

Generally, the coasting module 310 aids in determining how long the client device 300 may remain in a particular group 110 during periods of time in which the client device 300 has lost contact with the server 400, or during periods of intermittent contact with the server 400. In one example, the coasting module 310 takes into account various types of information, such as location information, time information, and activity of the client device 300 within the group 110 (for example, posting of content 120 to the group 110, initiation of the group 110 by the client device 300, and so on), to help determine if the client device 300 should remain in same group 110 as it did prior to the last significant contact with the server 400.

The content caching module 312 may store locally on the client device 300 content 120 that has been captured at the client device 300 but has not been posted to the server 400, such as during times when the client device 300 has lost contact with the server 400. In response to the connection between the server 400 and the client device 300 being restored, the cached content, including photos, audio, video, annotations, and the like, may then be uploaded to the server 400 for subsequent transfer to the other client devices 400 of the group 110.

The content push mechanism module 314 facilitates reception of content 120 and other data from the server 400 via the communication network 106 under a "push" data transfer model. For example, a Comet web application model may be employed to receive content 120 and other data under a "hanging GET" protocol, in which the server 400 maintains a HyperText Transfer Protocol (HTTP) request from the client device 300 indefinitely to push the content 120 and other data to the client device 400.

The content ingestion module 316 may be responsible for taking the content 120 captured at the client device 300 and possibly modifying, adjusting, or otherwise processing the content 120 before posting the data to the server 400. For still image content 120, examples of such processing may include, but are not limited to, scaling the image, and adjusting the resolution, orientation, brightness, sharpness, color, contrast, or focus of the image. These operations may depend on several factors, including, but not limited to, the capture and display capabilities of the client device 300, and the speed of the communication network 106 coupling the client device 300 and the server 400. The content ingestion module 316 may also package various metadata with the content 120, such as the location and environmental data discussed above, possibly to allow the server 400 to determine the group 110 to which the content 120 is to be distributed.

The tuning parameters module 318 may receive one or more parameters from the server 400 that may condition or modify the operation of one or more of the modules 302-316 of the client device 300. In one implementation, the tuning parameters module 318 may receive parameters that affect the operation of the coasting module 310 based on the last known location of the client device 300. For example, the length of time the client device 104 may be out of contact with the server 104, or the distance the client device 300 has traveled, before being removed from a group 110 may be adjusted based on available network access in the area of the client device 300. In some examples, other tuning parameters may be received from the server 400 that affect other modules, such as the location services module 304, the environment detection module 306, and the content push module 314. Such parameters may include, for example, how to process the proximity and environmental data being received at the client device 300, what communication address the client device 300 should use to receive content 120 updates, and so on.

In FIG. 4, the server 400 may include, for example, any or all of an API module 402, a user metadata module 404, an interaction recording module 406, an affinity calculator module 408, a group content ranker module 410 (which, in turn, may include a group candidate indexer 412 and a candidate scorer module 414), a push/subscribe module 416, a presence module 418, a content queue module 420, a face detection/recognition module 422, and an image quality detection module 424. In other servers 400, one or more of the modules 402-424 may be omitted, and other modules not depicted in FIG. 4 may be added.

The user metadata module 404 contains information associated with each of multiple client devices 300 for various users, such as identifiers associated with the client device 300 to allow communication with the other client devices 300. The user metadata may also include a list of contacts (such as other client devices 300) with which the client device 300 has interacted in the past. In one example, the contacts may be divided into an active contact list and an all contacts list. Based on recent interactions between the client device 300 and other client devices 300, the server 400 may promote client devices 300 from the all contacts list to the active list for the client device 300, and demote client devices 300 in the active list to the all contacts list. The promotion and demotion operations are the result of calculations made by the affinity calculator module 408, described below. The contacts lists can also be modified due to direct override instructions from the user of the client device 300. Other user preferences, such as which groups 110 the client device 300 has initiated or formed, and which groups 110 the client device 300 are to remain in regardless of previous client device 300 interactions (referred to below as "pinning,") may be stored via the user metadata module 404 as well. In some implementations, additional contacts may be added to the lists based on one or more inferences or algorithms. For example, a particular prospective contact may be added to the contact lists of a client device 300A based on, for example, triangle closing, in which the client device 300A and the prospective contact each have one or more common contacts.

The API module 402 facilitates at least two functions via two other modules of the server 400. For one, the API module 402 enables the recording of interactions between client devices 300 via the interaction recording module 406. Further, the API module 402 facilitates the answering of queries regarding affinity with other client devices 300, which are calculated by the affinity calculator module 408. In one example, the API module 402 maintains an affinity score between each client device 300 and other client devices based on the recorded interactions, with the affinity scores (generated by the affinity calculator module 408) being compared with a threshold value to determine whether other client devices 300 are placed in the active contacts list or the all contacts list maintained in the user metadata module 404, with a contact in the active contacts list indicating that the contact is active. The threshold may be a floating threshold in some implementations, the value of which may depend on how many other client devices 300 with which the first client device 300 has interacted. Other factors may affect the value of the threshold in some examples.

In one example, the interaction recording module 406 may keep track of the most recent interactions between the client device 300 and another client device 300, such as 100 or 200 interactions, in a type of first-in, first-out (FIFO) scheme. As a result, older interactions are deleted in most cases, as they are presumably of lesser importance than newer interactions. Some interactions may not be treated strictly according to such a FIFO scheme in some examples, such as another client device 300 that the first client device 300 has either "friended" or explicitly blocked, as such user preferences may be preserved, regardless of their age.

In the example of FIG. 4, the group content ranker module 410 includes two sub-modules: a candidate indexer module 412 and a candidate scorer module 414. Generally, the candidate indexer module 412 determines one or more possible groups 110 into which the client device 300 belongs. Such action may occur, for example, when the client device 300 is first powered up, or when an application that implements the various methods discussed herein is initiated. The candidate indexer module 412 may then forward the one or more identified groups 110 to the candidate scorer module 414, which may then generate a score, such as by way of a formula, each time the group content ranker module 410 is requested to perform the function. For example, the group content ranker module 410 performs the ranking for a client device 300 relative to the one or more groups 110 available when the client device 300 first attempts to join a group 110, or when the client device uploads an item of content 120, such as a photograph, video clip, audio segment, text block, or the like.

The group content ranker module 410 may then use the scores provided by the candidate scorer module 414 to sort and rank the content 120 according to the one or more groups 110. The group 110 with the highest score relative to the content 120 may then be selected for the client device 130 to join. In some implementations, the user of the client device 300 may have specifically indicated a preference for a particular group 110, in which case the group content ranker module 414 may select that group 110 for the content 120. In one example, the group content ranker module 414 compares the highest score for a group 110 to a threshold value. If the score attains the threshold, the server 400 may recommend the associated group 110 to the client device 300 for joining, or automatically join the client device 300 to the group 110. If, instead, the score is less than the threshold, the server 400 may generate a new group 110 for the client device 300 and push metadata associated with that group 110 to other client devices 300, such as those located proximate to the first client device 300, and allow those client devices 300 the option of joining the newly generated group 110. In one example, the group content ranker module 414 receives metadata regarding proximity, connections, and the like between the first client device 300 and other client devices 300 each time the group content ranker module 414 ranks the candidate groups 110 for particular content 120 to adjust the ranking.

The presence module 418 may be employed by the server 400 to determine which client devices 300 are located within some predetermined distance of the first client device 300. This server 400 may use this information to identify those client devices 300 that may be interested in joining a new group initiated by the first client device 300. To this end, the presence module 418 may maintain a real-time index of those client devices 300 in proximity to the first client device 300. For those client devices 300 not proximate to the first client device 300, the server 400 may poll those client devices 300 to determine their location in order to provide a group 110 with which they may be associated.

The push/subscribe module 416 may provide the functionality for the server 400 to push content to the client devices 300 of a particular group 110, as well as to provide one or more potential groups 110 to a client device 300, to which the user of the client device 300 may then subscribe or join. In one example, the server 400 automatically joins the client device 300 to the group 110 without requesting confirmation from the client device 300. As mentioned above, the pushing of content 120 may be facilitated by way of a Comet web application model to distribute content 120 and other data to the client devices 300 under a "hanging GET" protocol.

The content queue module 420 may maintain and manage content 120 that is yet to be distributed to one or more client devices 300. For example, the push/subscribe module 420 may not distribute each item of content 120 immediately to all client devices 300 of a group 110 if the number of client devices 300 is high enough to cause a significant delay in distributing the content 120 to all of the group 110 members. In such cases, the push/subscribe module 416 may then forward the content 120 (and possibly any associated metadata) to the content queue module 420, which then may hold the content 120, or transfer the content 120 to only a subset of the group 110 member devices, until a later time. The decision to queue the content 120 in the content queue module 420 may be based upon several factors, possibly including, but not limited to, the number of client devices 300 associated with the group 110 and the available bandwidth of the communication network 106.

The face detection/recognition module 422 may be employed to adjust still or video image content (for example, by cropping) based on the faces or other important features detected in the image prior to distributing the resulting content 120 to the group 110. In one example, the face detection/recognition module 422 may also correlate facial features with names of people in order to generate metadata identifying the person represented in the content 120. The metadata may then be attached to the content 120 prior to distribution to the group 110.

The image quality detection module 424 may process still images, one or frames of a video segment, and the like to ascertain one or more aspects of the images or frames, such as scaling, resolution, orientation, brightness, sharpness, color, contract, focus, and the like. The image quality detection module 424 may then determine the relative quality of the image and decide whether the image or frame is to be distributed to the remaining client devices 300 of the group, or should be discarded instead. In some implementations, the image quality detection module may adjust the image, such as cropping out-of-focus areas or less interesting portions of the image, brightening the image, and so forth before distributing the image to the group 110.

Figure 5:
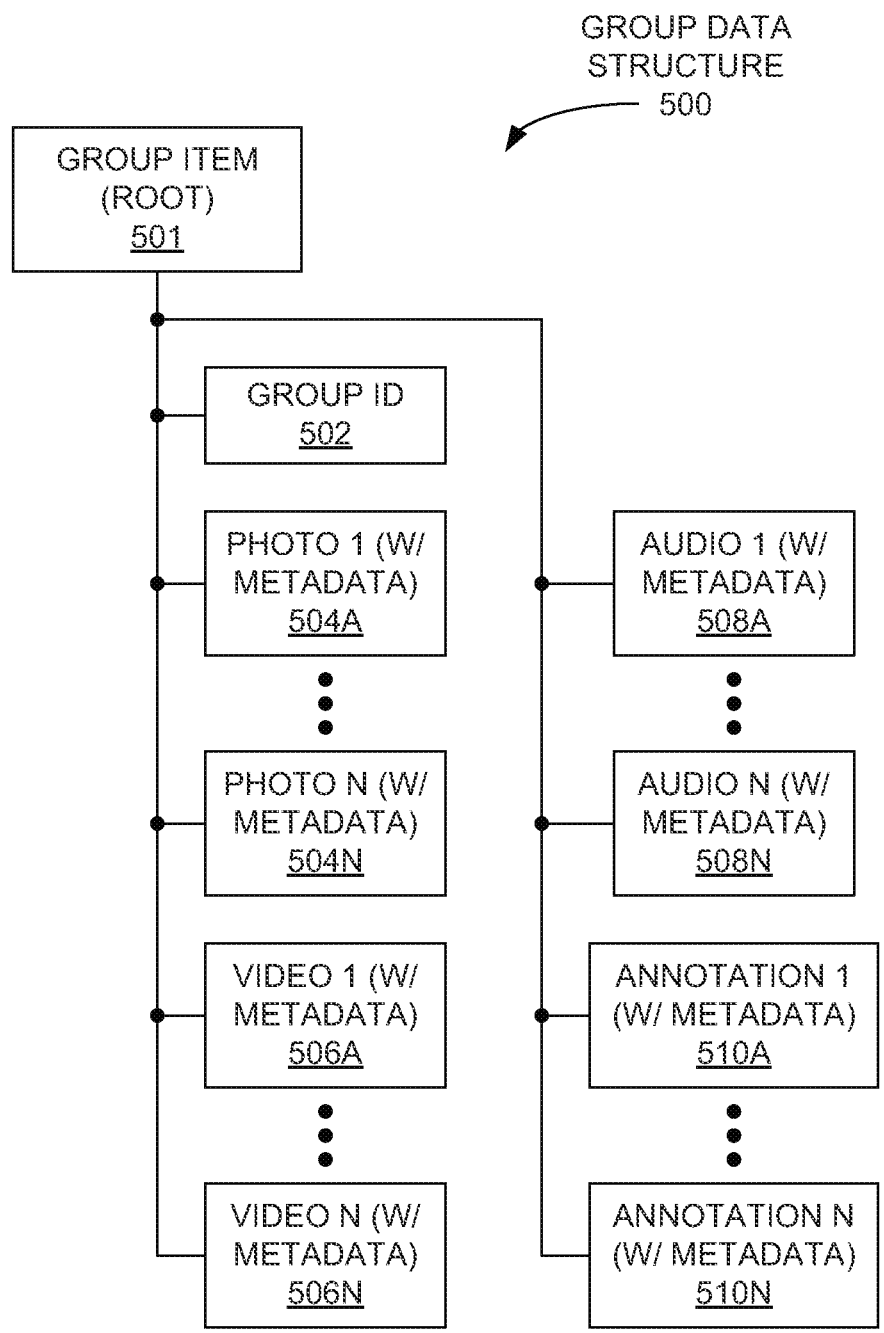
FIG. 5 is a diagram of an example data structure identified with a group of client devices of a communication system.

FIG. 5 provides a graphical representation of a group data structure 500 that maintains data related to the content 120 associated with a particular group 110. In this particular example, the group data structure 500 provides a root 501 or "parent" structure to which multiple "leaf" or "child" data structures 502-510 may be associated. Examples of the child data structures 502-510 may include, but are not limited to, a group identifier 502, a data structure 504A-504N for each photograph or still image associated with the group 110, a data structure 506A-506N for each video segment associated with the group 110, a data structure 508A-508N for each audio segment associated with the group 110, and a data structure 510A-510N for each annotation associated with the group 110. In some examples, an annotation may be a text string or other set of characters relating comments, likes, user ratings, and so forth from users of client devices 300 of the group 110. The annotations may be associated with particular content 120 or with the group 110 in general, such as invitations to other client devices 120 to join a particular group. Any or all of the root 501 and the leaf data structures 502-510 may also include, or be linked with, metadata discussed above that is associated with the client device 300 posting the content 120, possibly including, but not limited to, the identity of the posting client device 300, the time of capture of the content 120, information describing the location of the client device 300, and the environmental parameters sensed at the client device 300. As described above, this information may be used by the group content ranker module 410 to rank the various possible groups 110 associated with the content 120.

Each group data structure 500 may be logically associated with each client device 300 identified as a member of the group 110. Further, the server 400 may organize the client devices 300 according to their involvement in the group 110 as either contributing devices (for example, those client devices 300 providing or posting content 120 to the group 110) or presence devices (those client devices that are receiving content 120 but not providing the content 120). In some implementations, the presence devices are not considered to possess as strong a connection to the groups as the contributing devices, as they may possess only "ephemeral presence" in the group by being associated with the group temporarily before being associated with another group 110, such as by physically moving away from the first group 110 without contributing content 120, and then coming in close proximity to a second group 110.

Figure 6:
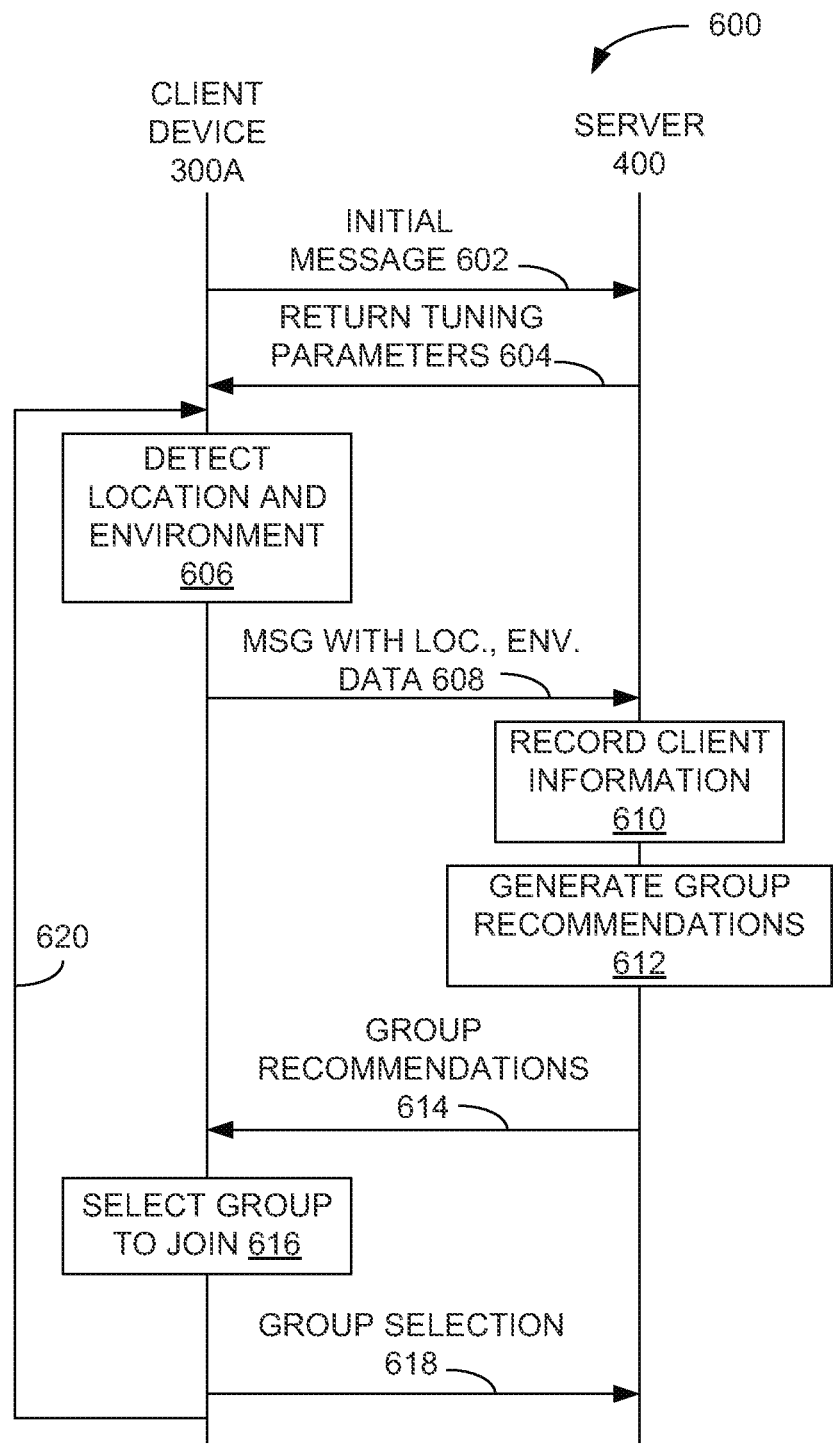
FIG. 6 is a flow diagram illustrating an example method of joining a client device to a group of client devices within a communication system.
Figure 8:
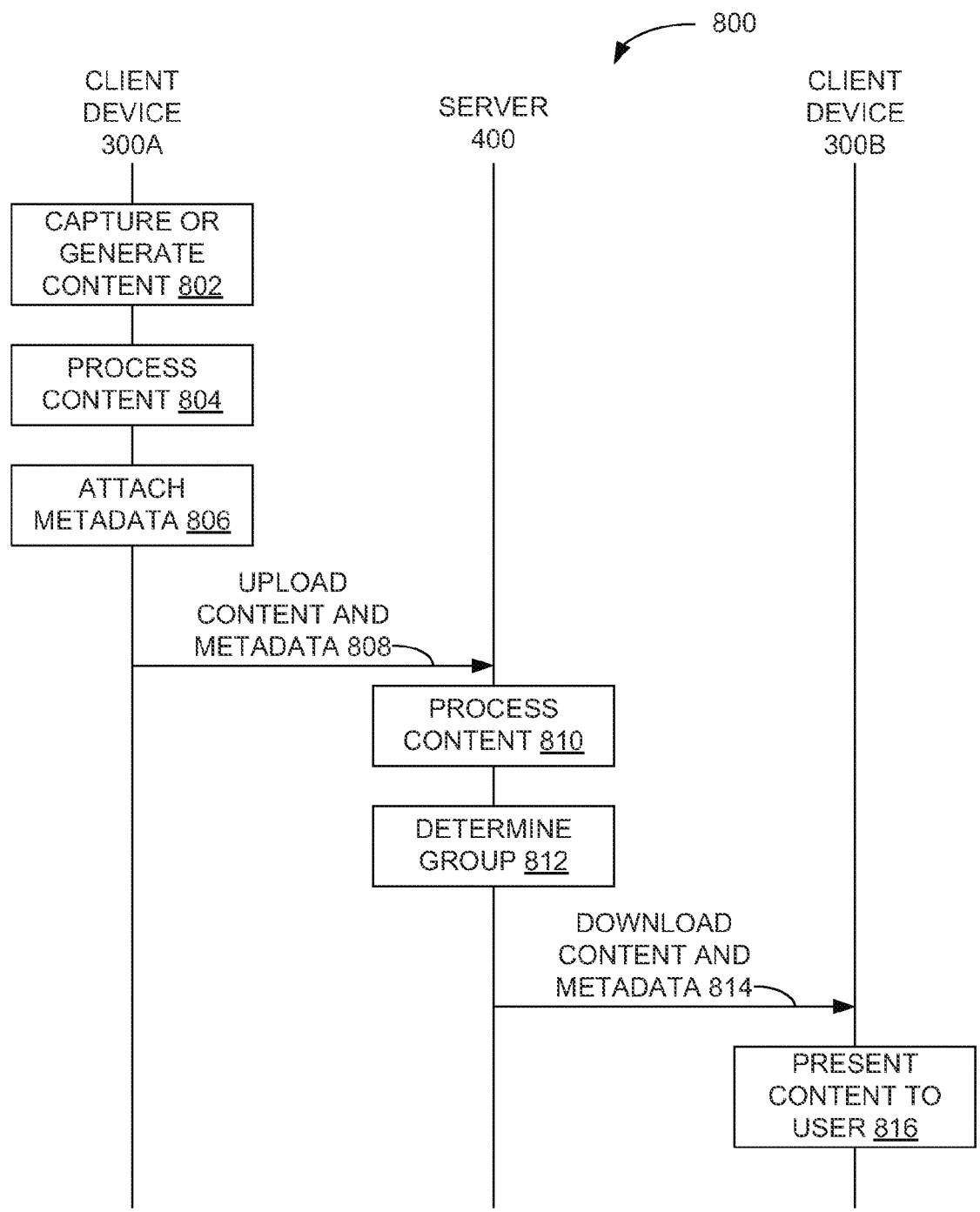
FIG. 8 is a flow diagram illustrating an example method of sharing content among a group of client devices in a communication system.

FIG. 6 provides portions of an overall block diagram of operations and interactions between the server 400 and a client device 300A attempting to join a group 110 according to one specific example of a method of distributing content within a group 110. Other client devices 300 other than the client device 300A are generally referred to as client devices 300B, as shown in FIG. 8. Other possible examples may omit one or more operations and communications described in FIG. 6, or may add other operations and communications not shown therein.

In FIG. 6, a client device 300A may provide an initial message to the server 400 via the API module 402 upon powering up or initiating a specific application (operation 602). Such a message may be termed a "bootstrap" message. In response, the server 400 may supply one or more tuning parameters via the API module 402 for various modules of the client device 300 (operation 604), as described above. At some point after receiving the tuning parameters, the client device 300A retrieves or generates location information (via the location service module 304) and environmental data (via the environment detection module 306) (operation 606). The client device 300A may then transmit a recurring message (sometimes referred as a polling or "I am here" message) containing the generated location and environment data to the server 400 via the API module 402 (operation 608).

In response to the polling message 602, the API module 402 of the server 400 may record information specific to the client device 300A (operation 610). For example, the API module 402 may inform the presence module 418 of this information so that the presence module 418 may determine other potential client devices 300B within physical proximity to the first client device 300A. The API module 402 may also cause the push/subscribe module 416 to subscribe the client device 300A to the server 400 so that the client device 300A will receive updates regarding new content 120, new groups 110, new member client devices 300B for a group 110 to which the client device 300A belongs, and so on.

Figure 7:
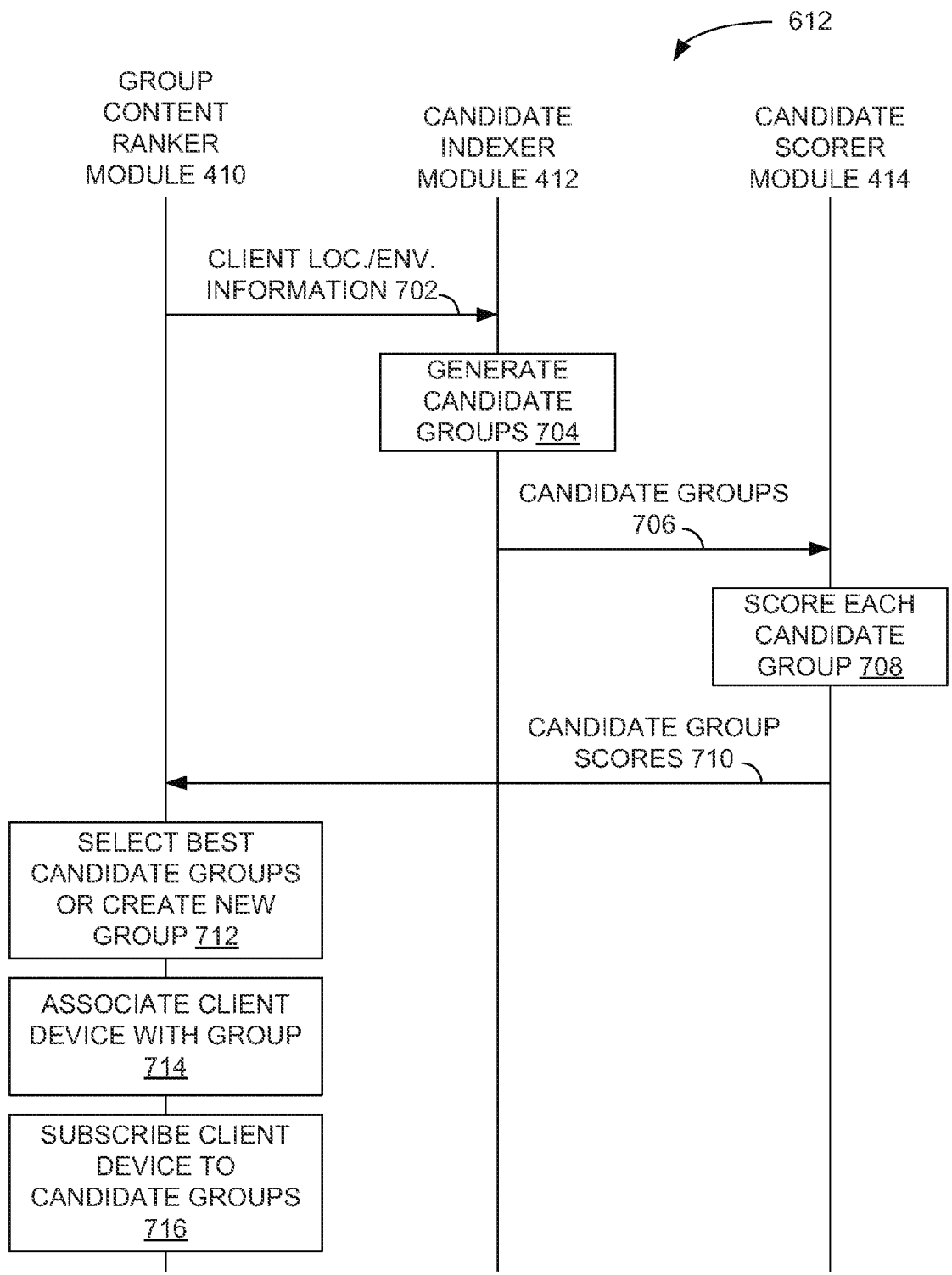
FIG. 7 is a flow diagram illustrating an example method of determining a group for a client device to join in a communication system.

Also in response to the polling message 608, the API module 402 may invoke the group content ranker module 410 with the received location and presence information to generate group recommendations for the client device 300A (operation 612). A more detailed example of this operation is provided in FIG. 7. In that example, the group content ranker module 410 may provide the client device 300A location and environmental information to the candidate indexer module 412 (operation 702) so that the candidate indexer module 412 may identify candidate groups 110 for the client device 300A (operation 704). The candidate groups 110 may include all groups 110 in the vicinity of the client device 300A. In one example, the vicinity of the client device 300A may be defined relative to a predefined area, so that the candidate indexer module 412 may then determine the location of the client device 300A relative to other client devices 300 for various groups 110 in the same or adjacent areas. Other groups 110 not in the vicinity may also be considered, such as current or recent groups 110 to which "friends" of the client device 300A may belong (or have recently belonged), or to which the client device 300A may have been attached previously.

The candidate indexer module 412 may then provide the candidate groups to the candidate scorer 414 (operation 706), which may then independently score each of the candidate groups 110 provided by the candidate indexer module 412 (as described above) (operation 708) and provide those scores to the group content ranker module 410 (operation 710). In one example, the candidate scorer module 414 may receive several input factors to determine the score for a particular group. One such type of factor is explicit actions taken by users of the client device 300A regarding previous groups 110 or associated client devices 300 to which the client device 300A was attached. Such actions include, for example, manually joining a previous group 110, manually creating a previous group 110, manually maintaining an attachment to a previous group 110 regardless of subsequent changes in location (referred to as "pinning" to a group 110), and designating a particular client device 300 as a "friend." Information may also be provided to the candidate index scorer module 414 whether such a friend is present in the candidate group 110, and whether the friend contributed content 120 to the candidate group 110 (including annotations). The candidate index scorer module 414 may also consider actions of the user of the client device 300A regarding previous interactions with the candidate group 110, such as presence in the group 110 and contribution of content 120 and/or annotations. In some examples, the candidate index scorer module 414 may also consider one or more factors indicating the relative "loneliness" of the client device 300A based on the number of friends, contributors, and the like previously associated with the client device 300A in other groups 110. The candidate index scorer module 414 may also consider the time, location, and environmental information provided by the client device 300A via the API module 402 of the server 402.

The candidate index scorer module 414 may represent any and/or all of these factors by numerical values, which the candidate index scorer module 414 may then subsequently weight to determine the relative importance of each factor. Various maximum or minimum limits may be placed on each of the values. Further, one or more various time-varying functions may be applied to each weighted factor value, such as, for example, exponential decay, asymptotic growth, or a decreasing ramp, to represent the effect of the passage of time on the factor. For example, factors relating to the location of the client device 300A at various times may be conditioned with an exponential decay function such that older locations become less important to the scoring over time. An asymptotic growth function which approaches a particular maximum value may be applied to factors addressing the amount of contribution activity of friends of the client device 300A. Other factors, such as the manual actions of the user of the client device 300A relative to the joining, creating, and pinning of groups 110 may not be conditioned with a particular time-varying function.

Each of the resulting values may then be combined by way of an aggregating function to determine the overall score for a candidate group 110. In one example, the overall algorithm, including the factor weights, the applied time-varying functions, and the aggregating function may remain constant or static, while in other implementations, they may be altered over time as a result of one or more machine learning algorithms.

Upon receiving the candidate groups and their scores, the group content ranker module 410 either selects one of the candidate groups 110 for the client device 300A, or generates a new group 110 for the client device 300A (operation 712). In one example, the group content ranker module 410 compares the score of each candidate group 110 to a predetermined threshold. If at least one of the candidate groups 110 possesses a score meeting or exceeding the threshold, the group content ranker module 410 may select one or more of the candidate groups 110 with the highest scores exceeding the threshold for the client device 300A to join. Instead, if none of the candidate groups 110 possesses a score as high as the threshold, the group content ranker module 410 may create a new group 110 for the client device 300A to join. In the case of a new group 110, group content ranker module 410 may also associate the location and environmental metadata for the client device 300A with the new group 110 so that other client devices 300B in the vicinity of the client device 300A may be asked to join the new group 110.

In some implementations, the group content ranker module 410 may also take into account previous user preferences regarding groups in order to select a group 110 for the client device 300A. Such preferences may include, for example, favoring the joining of a group 110 that includes specific client devices 300B, such as "friends," or blocking the joining of a group 110 that includes other specific client devices 300B. Such preferences may override the scores for the candidate groups 110 provided by the candidate scorer module 414.

After the group content ranker module 410 selects the one or more groups 110 for the client device 300A to join potentially, the group content ranker module 410 may then associate the client device 300A to the selected group or groups 110 (operation 714) by indicating to the presence module 418 that the client device 300A is to be joined to the candidate group or groups 110, and is to be removed from other groups 110 in which the client device 300A may have been active. The push/subscribe module 416 may also be employed to subscribe the client device 300A to all real-time changes detected for that group (operation 716), such as new content 120, changes in group 110 membership, and so on. The client device 300A may also be subscribed to other candidate groups 110 nearby in case a switch to one of those groups 110 is subsequently warranted due to location changes and other circumstances.

For at least some of the embodiments described herein, the algorithms employed to perform various functions regarding the formation of a group 110 (such as those performed by the affinity calculator module 408, the candidate indexer module 412, candidate scorer module 414, and/or the group content ranker module 410, for example) may be based on one or more types of modeling. Examples of such modeling may include, but are not limited to, logistic regression, Bayesian networks, random forest modeling, and neural networks.

Returning to FIG. 6, the API module 402 of the server 400 provides the recommended groups to the client device 300 (operation 614). In one example, the API module 402 provides a strong recommendation for one of the recommended groups 110 for the client device 300A to join based on the highest score generated by the candidate scorer module 414. In response, the user of the client device 300A selects one of the recommended groups 110 (operation 616). The client device 300A may then inform the server 400 of the selection via the API module 402 (operation 618). In another example, the server 400 may simply select the highest-ranked group 110 for the client device 300A and inform the client device 300A of the selection of the group 110, in which case the client device 300A need not select a particular group 110 to join or inform the server 400 of the selection. In some cases, the client device 300A may instead be able to explicitly change the group 110 selected by the server 400 to another of the candidate groups 110.

In one implementation, the server 400 may be capable of detecting circumstances in which multiple client devices 300 attempt to create a new group 110 nearly simultaneously, which should logically be the same group 110. In this example, the server 400 analyzes one or more factors, including, but not limited to, the location and environmental conditions of the client devices 300 attempting to create a new group 110, and the timing of the creation of the groups 110. Based on that analysis, the server 400 may instead create a single group 110 for all of the involved client devices 300 to join.

At this point, the client device 300A and the server 400 are in agreement as to the particular group 110 that the client device 300A has joined. Further, the entire evaluation process of operations 606-618 of deciding whether the client device 300A should remain in the current group 110 (or be removed from the group 110, possibly in order to join a new group 110) may be performed again in response to one or more events 620. One such event 620 may be the expiration of a timeout timer, or "heartbeat" counter, which may cause the client device 300A to gather location and environmental data (operation 606) and transmit another polling message containing that data (operation 608) once a certain period of time (for example, three or five minutes) has elapsed since the last polling message was transmitted. The heartbeat counter may be maintained either in the server 400 or the client 300A. Another such event 620 may be the generation of a new group 110 in the vicinity of the client device 300A, in which case the server 400 informs the client device 300A of the new group 110, causing the client device 300A to transmit another polling message 608. Further, another event 620 may occur if the client device 300A detects significant physical movement (via location or environmental data of the client device 300A). In some implementations, the user of the client device 300A may explicitly request a re-initiation of the grouping process, thus constituting another type of the event 620. In each case, the server 400 may then determine that the client device 300A should either remain in the current group 110, or switch to another group 110, based on the scores generated for each group 110 in the server 400. In other examples, the grouping operations 606-618 may also occur in response to the creation or capture of content 120 in the client device 300A, which is then uploaded to the server 400 for distribution to other member client devices 300B of the group 110.

In some implementations, a group 110 may be strongly identified with, or "pinned" to, a particular location or venue, such as a local pub, or a stadium or arena. As a result, the user of the client device 300A may explicitly request a re-initiation of the grouping process when entering such an area, or the server 400 may initiate the process in response to detecting that the client device 300A has entered that area.

Accordingly, the server 400 may thus provide the client device 300A with the option of joining that particular group 110. Similarly, upon leaving such a predetermined area, either the server 400 or the client device 300A may again initiate the grouping process to find another group 110 for the client device 300A.

In yet other embodiments, the server 104 may initiate the grouping process for the client device 300A with the intent of removing the client device 300A from its current group 110 in response to unwanted, objectionable, or fraudulent behavior by the user of the client device 300A. For example, other member client devices 300B of the group 110 may signal the server 104 to request that the client device 300A be removed from the group 110. Depending on the number and nature of the requests from the other client devices 300B, the server 400 may either reinitiate the grouping process while requiring the client device 300A to be removed from the current group 110, or just unilaterally remove the client device 300A from the group 110 without attempting to join the offending client device 300A to another group 110. In another implementation, the server 110 may perform such actions without requests or other input from the other client devices 300B of the group 110 by way of some algorithm or heuristic. For example, the server 104 may base a decision to exclude the client device 300A from the group 110 upon detection of the client device 300A posting an inordinate amount of content 120, or posting objectionable content 120, such as inappropriate comments, photos, and the like.

In the event that the client device 300A loses contact with the server 400 for periods of time, and thus is not able to provide the polling message 608 with the location and environmental data in a timely manner, the coasting module 310 of the client device 300A can determine whether (or for how long) the client device 300A remains in the joined group 110. In one example, the server 400 pushes a set of guidelines or instructions employed by the coasting module 310 to determine under what conditions the client device 300A has left its selected group 110. For example, various conditions, such as a lack of contact with the server 400 for a predetermined minimum period of time, movement by the client device 300A exceeding some minimum distance, and/or possibly some change in interaction between the client device 300A and another client device 300B (such as a "friend"), may cause the coasting module 310 to determine that the client device 300A is no longer part of its selected group 110.

While joined with a group 110, the client device 300A may upload content that is captured or generated in the client device 300A to the server 400 for distribution to other member client devices 300B of the group 110. FIG. 8 provides a flow diagram of a method 800 for distributing or sharing the content 120. For example, in response to the user of the client device 300A activating a camera button of the client device 300A, entering text into the client device 300A, or performing a similar action, the client device 300A captures the associated content 120 (operation 802).

The client device 300A may also process the content 120, such as provide thumbnail versions of a photo, as well as other information relating to the photo, to generate additional data to be included with the content 120 (operation 804). The client device 300A may also attach to the content 120 the various location and environmental metadata provided via the location services module 304 and the environment detection module 306, as well as possibly the identity of the client device 300A (operation 806). Other information regarding the content 120, such as brightness and contrast scores for an image, may also be attached as metadata to the content 120. The client device 300A may then upload the content 120 and attendant metadata to the server 400 via the API module 402 (operation 808).

Upon receipt of the content 120 and metadata, the server 400 may then process the content 120 (operation 810). In some examples, the server 400, via the face detection/recognition module 422 and the image quality detection module 424, may modify the content 120, such as crop still images to show better show faces, or eliminate portions of images, or entire images, that are of poor quality. Further, the server 400 may be capable of associating user names with faces appearing in images, and providing those names as metadata to the receiving client devices 300B. That information may also be employed in some embodiments to associate other client devices 300B with the group 110. The server 400 may employ other types of processing of the content 120 in other examples.

The server 400 also determines the group 110 that the client device 300A is currently associated with (operation 812). In one implementation, if the client device 300A has maintained contact with the server 400 prior to the uploading of the content 120 and associated metadata (operation 808), the API module 402 may determine that the current group 110 with which the client device 300A is joined is the intended destination group 110. If, instead, the client device 300A had previously lost contact with the server 400, the server API module 402 may cause the group candidate ranker module 410 to determine, via the metadata associated with the content 120, if the client device 300A belonged with another group 110 at the time the content 120 was captured or generated. Once the group 110 determination has been made, the API module 402 may also store the content 120 and associated metadata as a child data structure of the group data structure 500 associated with the group 110.

Once the group 110 associated with the client device 300A is determined, the server 400 may then download the content 120 and metadata via the push/subscribe module 416 to the client devices 300B with the group 110 (operation 814). For example, each of the other client devices 300B may be sent a message indicating that the content 120 from the client device 300A is available for download via the Comet model mentioned earlier. In some implementations, the other client devices 300B may download thumbnail sketches or other forms of the content 120 prior to downloading the full content 120, depending on the size of the content 120, the bandwidth available in the connection between the server 400 and the other client devices 300B, and other factors.

After downloading the content 120 and any related metadata, the receiving client device 300B may present the content 120 to the user (operation 816) such as by way of a user interface of the client device 300B. Also, the content 120 may be archived in the client device 300B for subsequent retrieval and presentation to the user, such as by way of a content "diary." described below.

Other than content 120, other types of information can be pushed to any of the client devices 300 of a particular group 110. This information may include, for example, a notification that another client device 300 has joined the group 110 to which the client device 300 receiving the notification is joined, and that a new group 110 is available to the client device 300 receiving the notification. In one implementation, these notifications, including a notification of new content 120, may be provided via the user interface of the receiving client module 300, such as via an "inbox" window or similar area of the user interface.

Figure 9A:
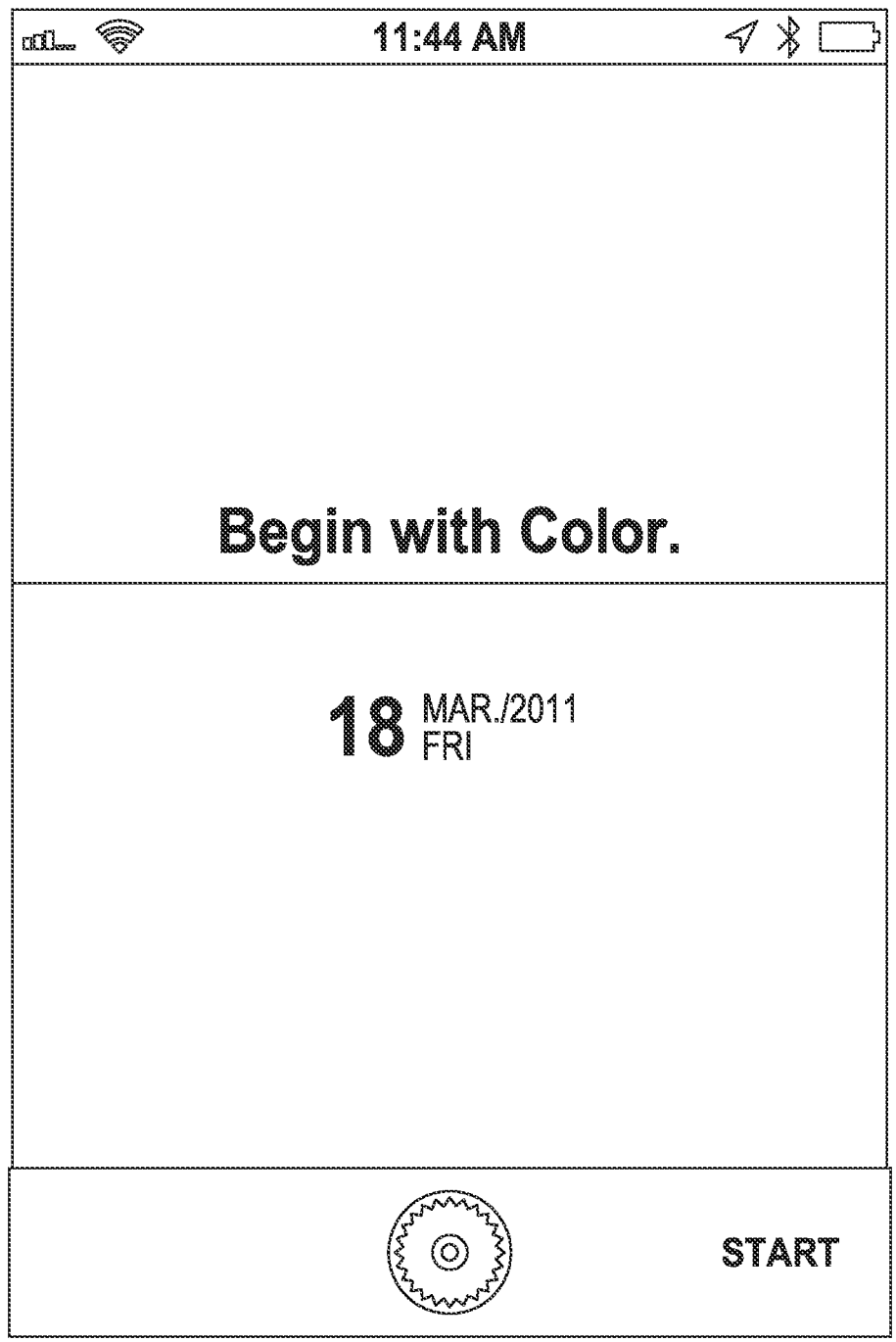
FIGS. 9A through 9L are a set of screen shots of an example user interface provided by a client device in a communication system.
Figure 9B:
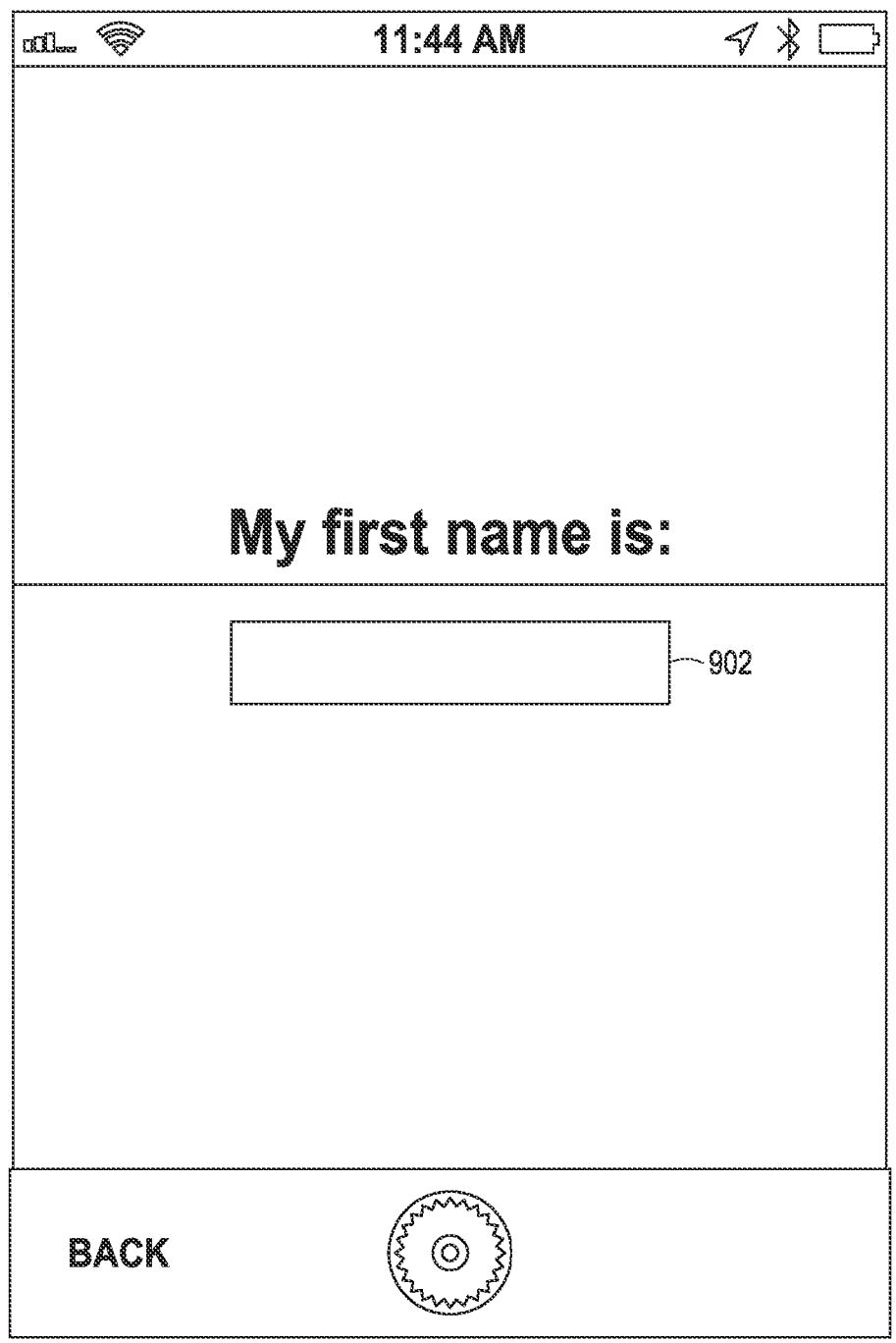
Figure 9C:
Figure 9D:
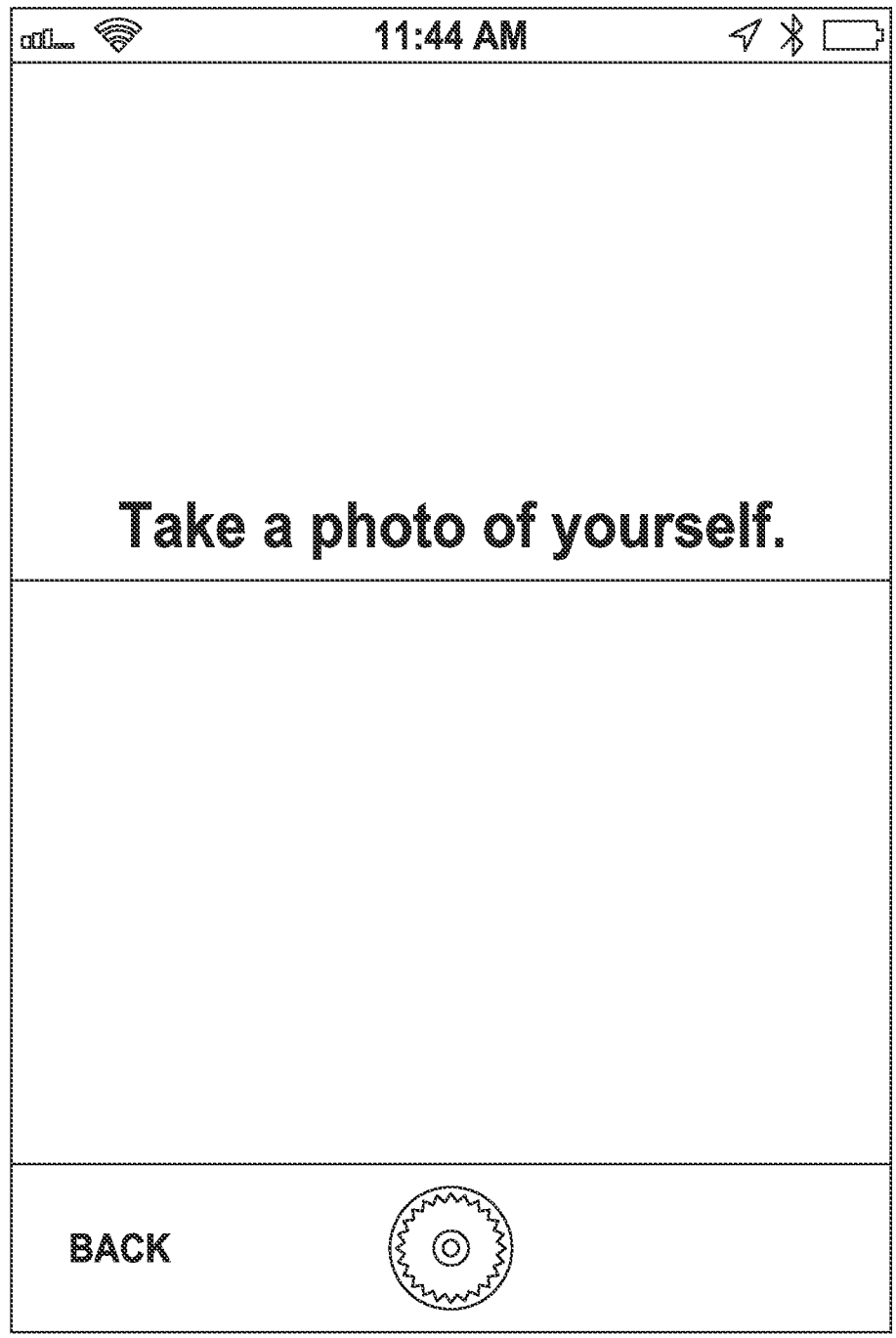
Figure 9E:
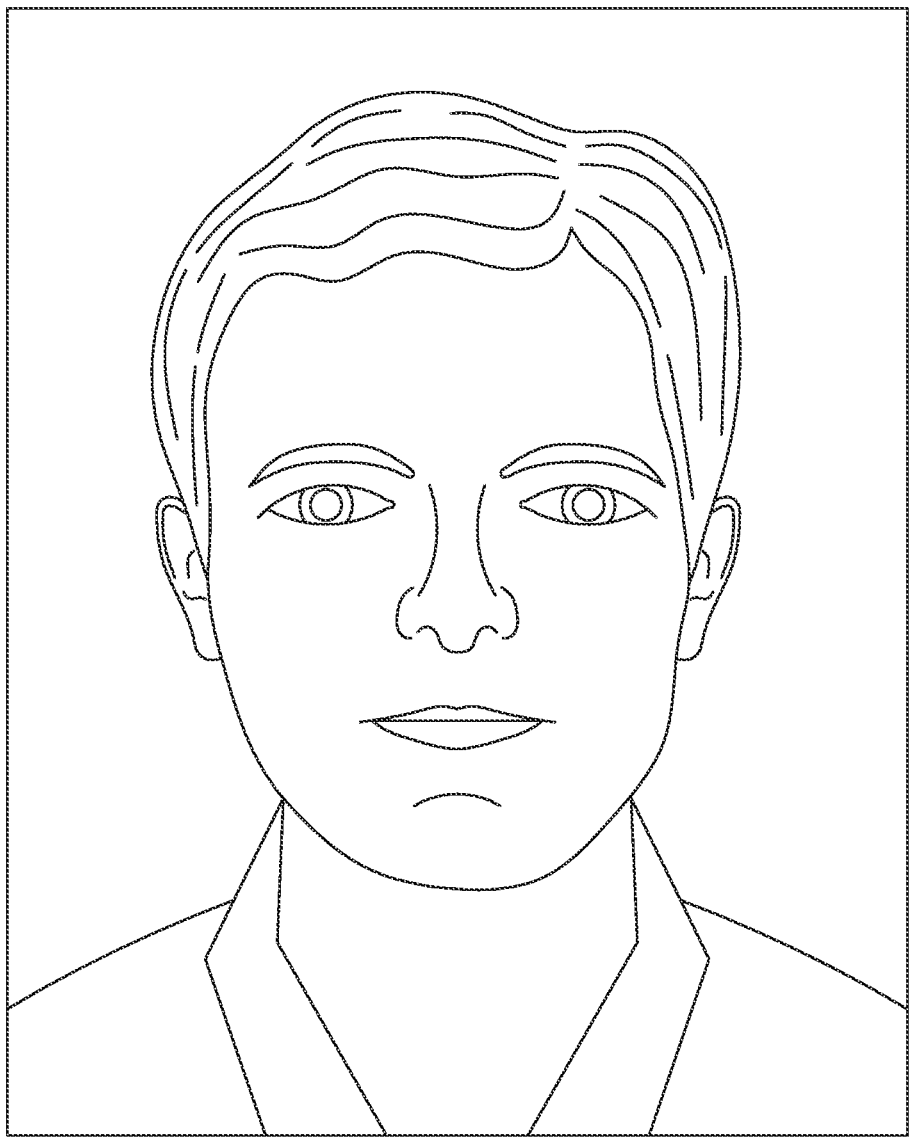

FIGS. 9A through 9L provide screen views of an example user interface of a client device 300A under various circumstances as described above. For example, FIGS. 9A through 9E provide a series of user interface views in which a user initiates an application on a client device, such as a "smart" phone, and provides information to identify the client device 300A from among a group of client devices 300 represented on the user interface. The application provides the content-sharing functionality described in at least one of the above examples. More specifically, FIG. 9A, provides a start-up screen when the application is initiated. The user interface of FIG. 9B presents an input field 902 for a first name of the user of the client device 300A. FIG. 9C shows a subsequent screen in which the input field 902 has been populated. Once the input field 902 is filled, the application prompts the user to provide a self-photo (as shown in FIG. 9D) so that the user may be represented by a photo "icon" on subsequent screens. The self-photo is displayed in FIG. 9E. At this point, the application is ready for the user to utilize in joining groups and sharing content. In FIGS. 9F through 9L to follow, the content being shared are still photo images and annotations, although other types of content may be shared as well.

Figure 9F:
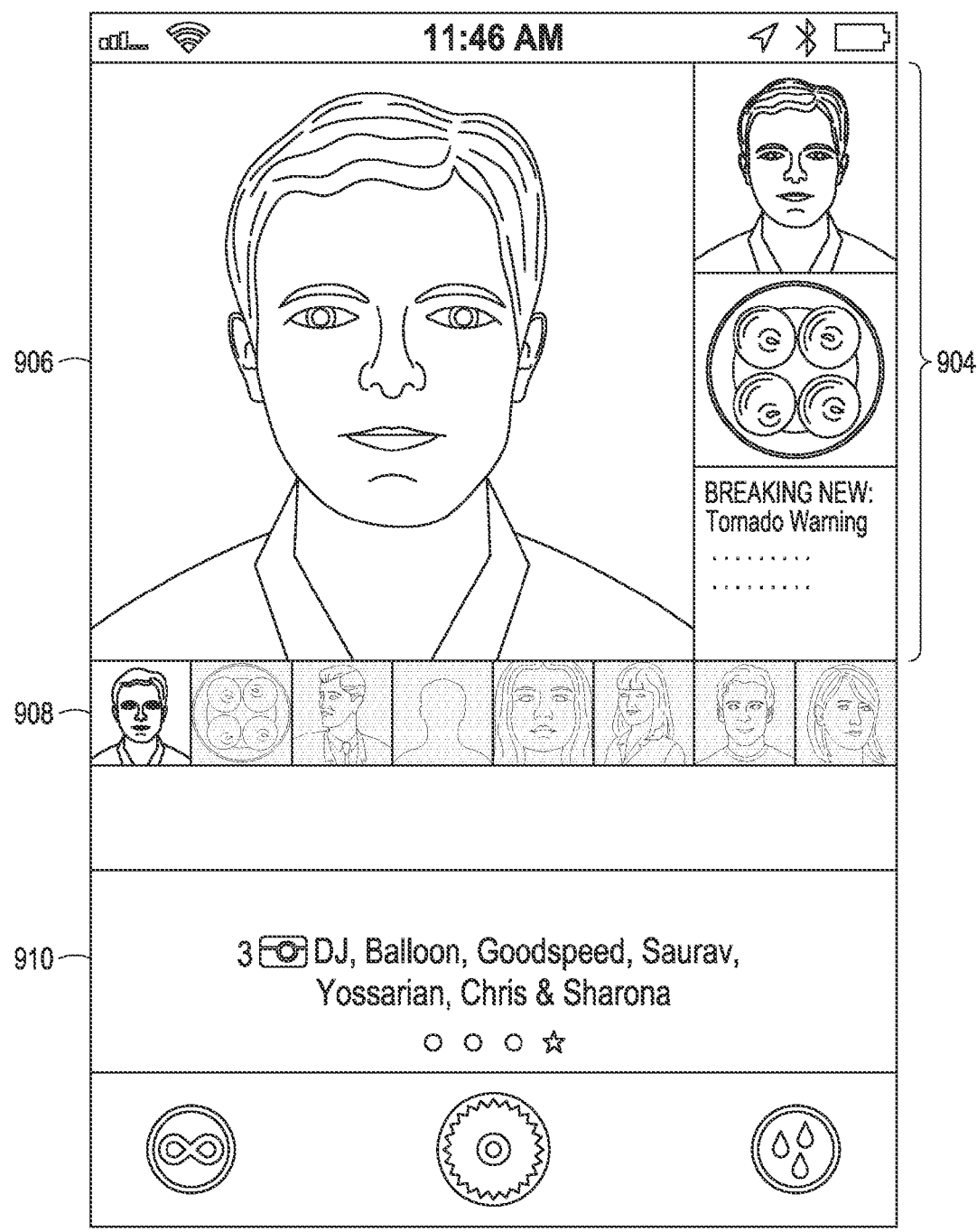

FIG. 9F provides a screen view of the user interface while photos are being captured and distributed among a group of client devices 300 of a group 110. The photo strip 904 along the right side of the screen are the most recent photos that are being received in real-time from the various members of the group 110, with the most recent photo being highlighted in a large display window 906. A "ribbon" 908 of photo icons, each representing a member of the current group 110, is also presented to the user. In some examples, such as the example of FIG. 9F, each of the photos of the ribbon 908 is adjusted to reflect a relative connection strength or affinity of the client device 300A relative to the group 110, based on one or more factors associated with the image, such as, for example, physical location and environmental data of the device associated with the image. In FIG. 9F, the higher relevance of the leftmost photo (associated with the present client device 300A) is indicated by the brightness and color content of the image in comparison to the remaining photos of the ribbon 908, which are essentially devoid of color, and are darkened. Other ways of distinguishing the connection strength or affinity of the client devices 300, such as sharpness or size, may also be employed. A group field 910 displays the names of members of the current group 110. One of the icons (the silhouetted image) shows that neither a name nor a photo icon is associated with that particular client device 300.

Figure 9G:
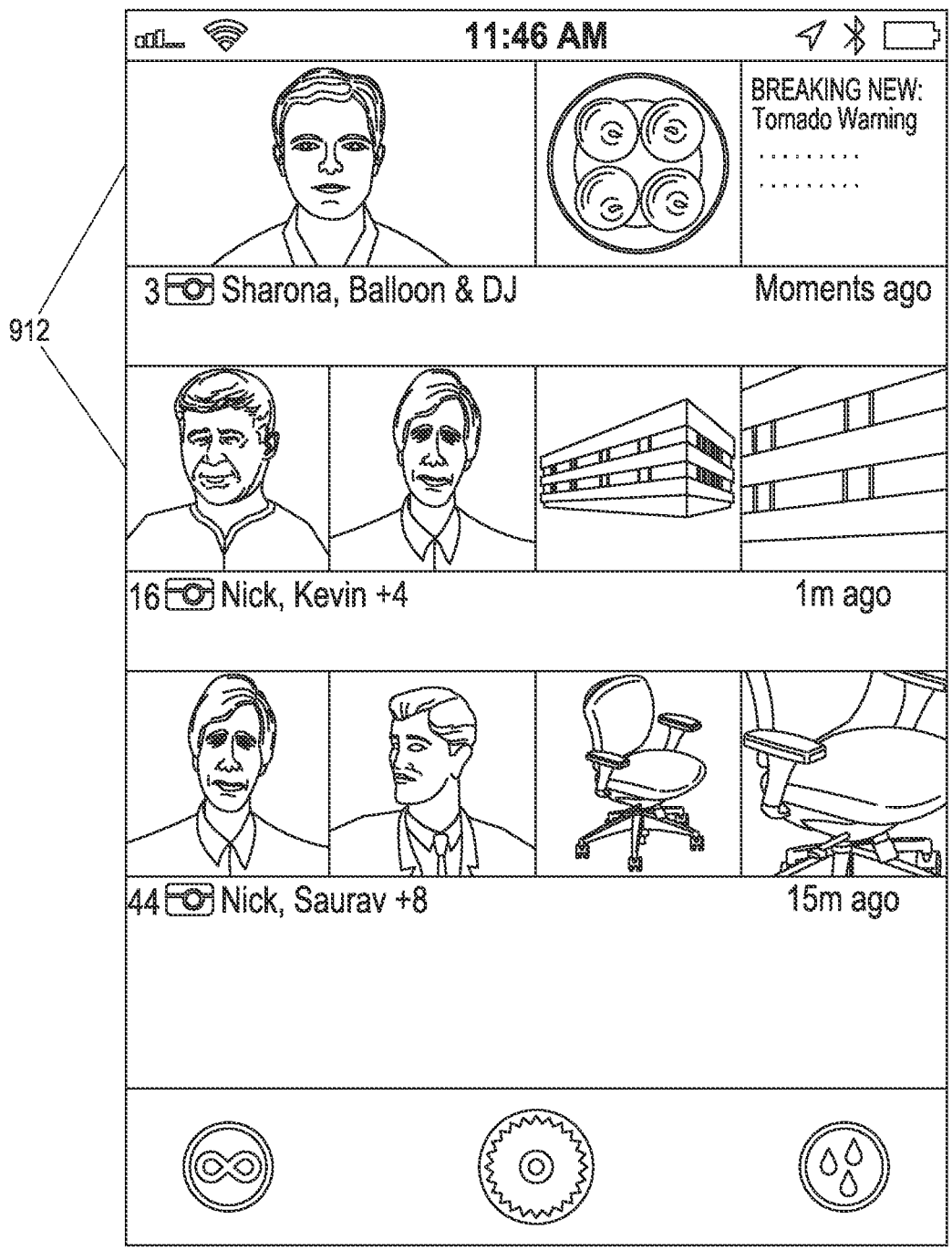

FIG. 9G provides multiple content "diaries" 912, wherein each diary 912 contains multiple content items that were distributed to a particular group 110 of client devices 300. The top diary represents the most recent group 110 with which the current client device 300 is or was associated. Each diary 912 is marked with the number of content items, the type of content, the names for each client device 300 associated with the group 110, and how long ago the most recent image for that group 110 was captured.

Figure 9H:
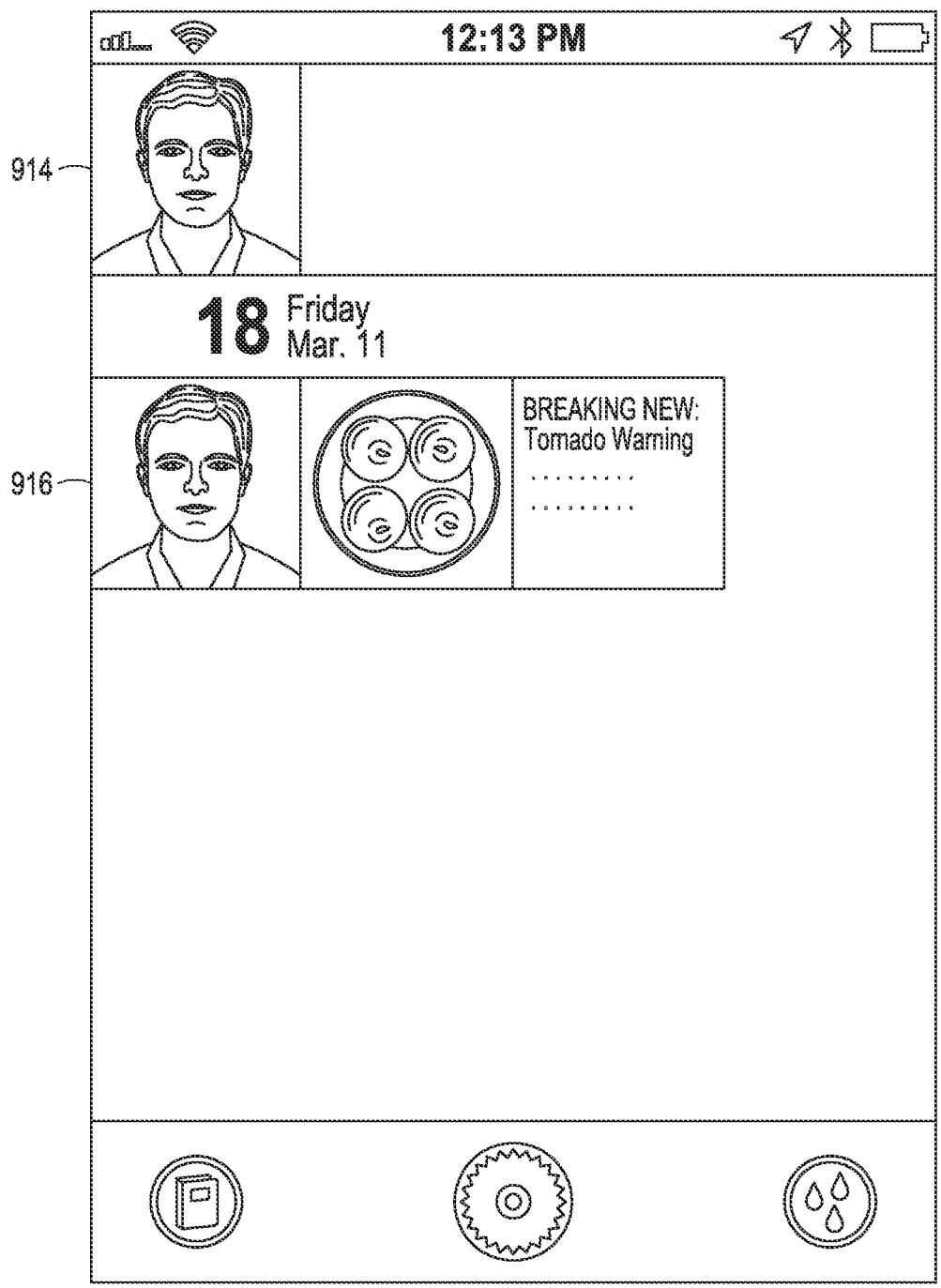

FIG. 9H provides a screen view in the event of a group 110 created by the client device 300A, and that currently contains only the present client device 300A, as shown via a group member area 914. The content area 916 shown below the group member area 914 lists the content items that have been posted for that group 110, which have all been captured by the current client device 300A.

Figure 9I:
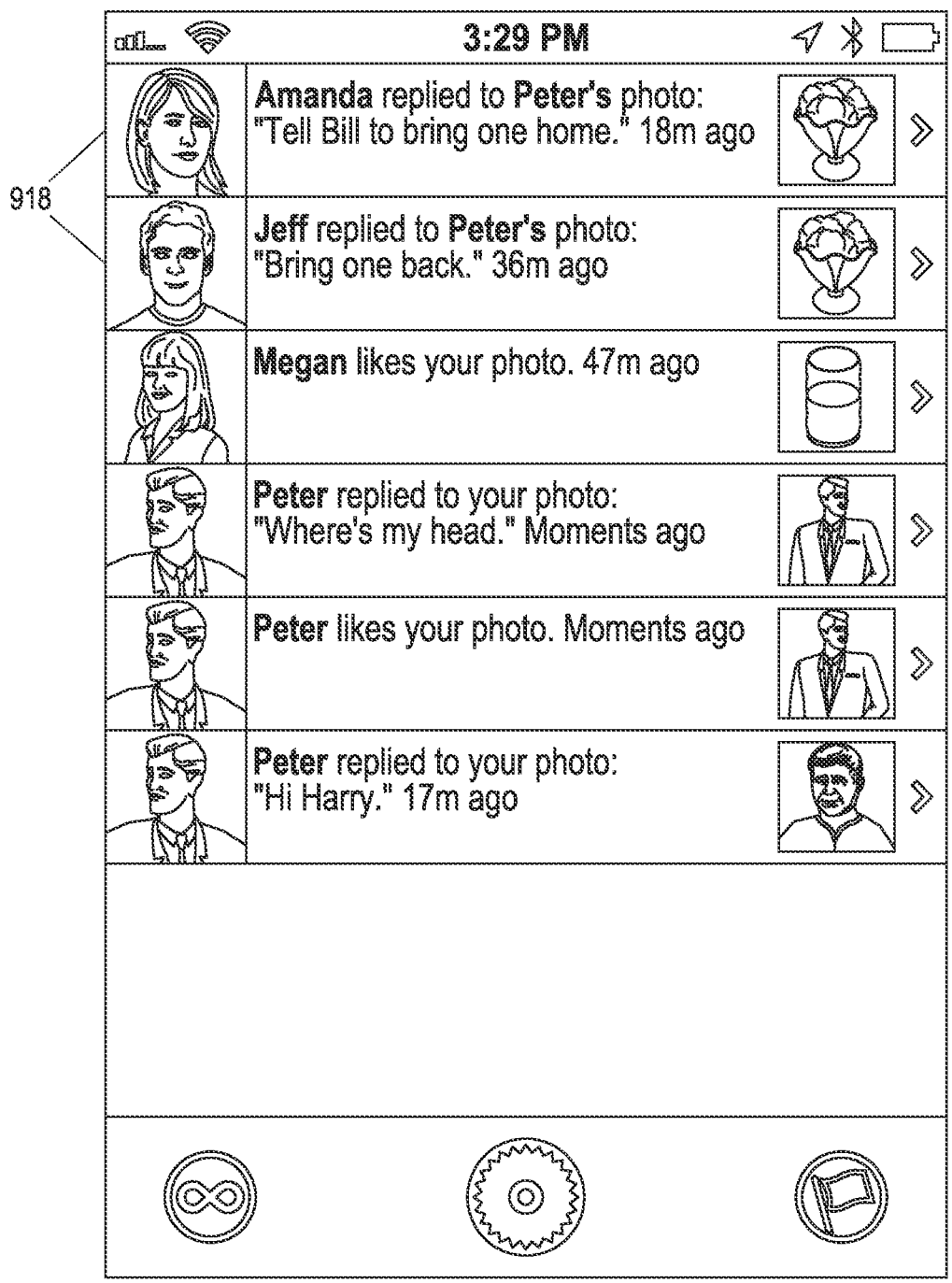

FIG. 9I provides a list of annotations 918 posted by various members of a group 110 in a type of "inbox" format. The annotations 918 are arranged alphabetically according to the name of the client device 300 posting the annotation, although other arrangements, such as chronologically, are also possible. The annotations 918 may include, for example, comments to photos, "likes," and star ratings. As presented in FIG. 9I, each annotation 918 provides the name of the poster of the annotation 918, the name of the client device 300 to whom the annotation 918 is directed, how long ago the annotation 918 was posted, a photo icon representing the poster, and the annotation 918.

Figure 9J:
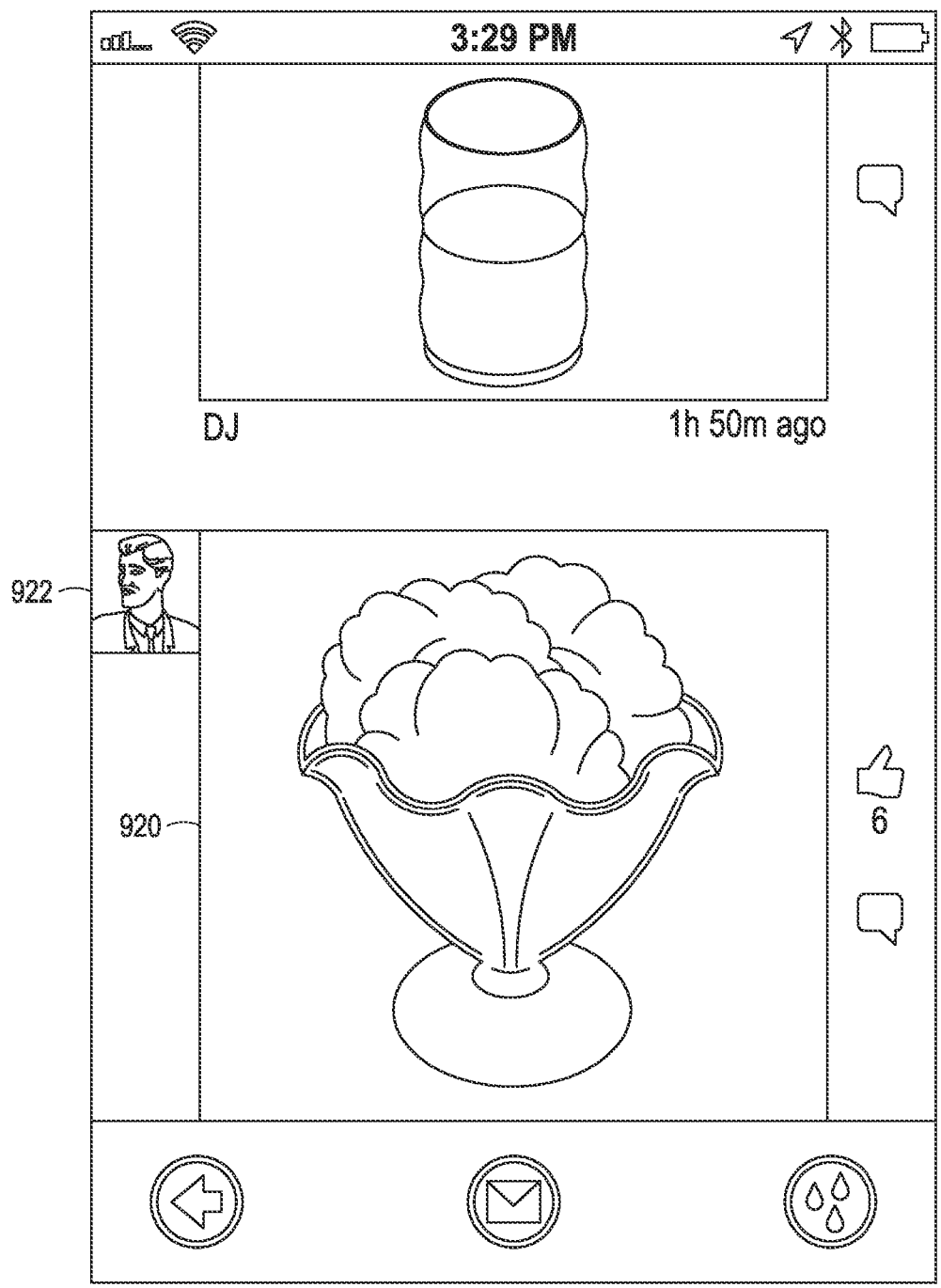

FIG. 9J provides a screen view of a list of content items 920 (in this case, photos), with each photo marked with a user icon 922 of the poster of the photo, along with the name of the poster and how long ago the photo was captured.

Figure 9K:
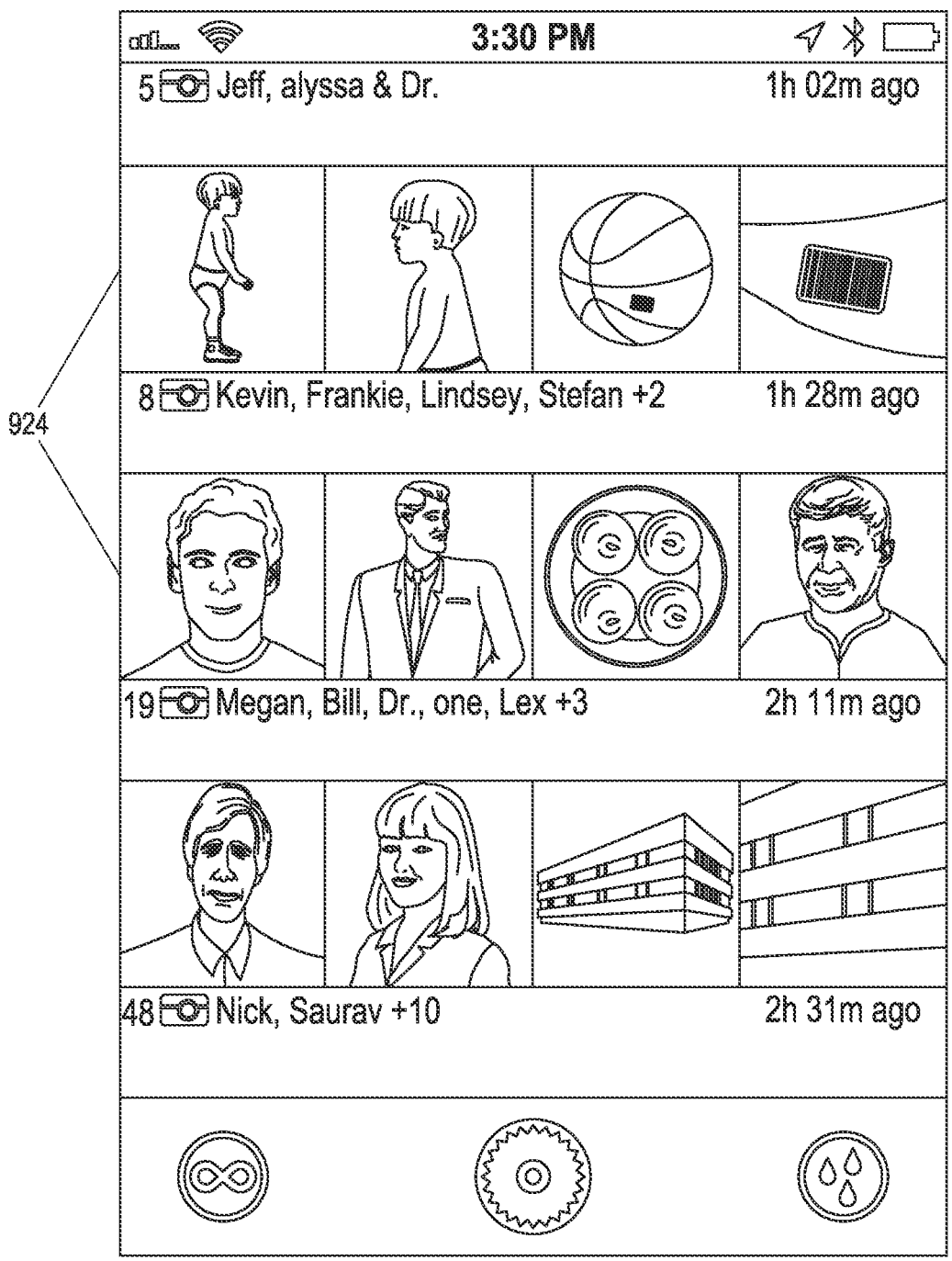

FIG. 9K depicts a screen view of several content diaries 924, similar to those shown in FIG. 9G.

Figure 9L:
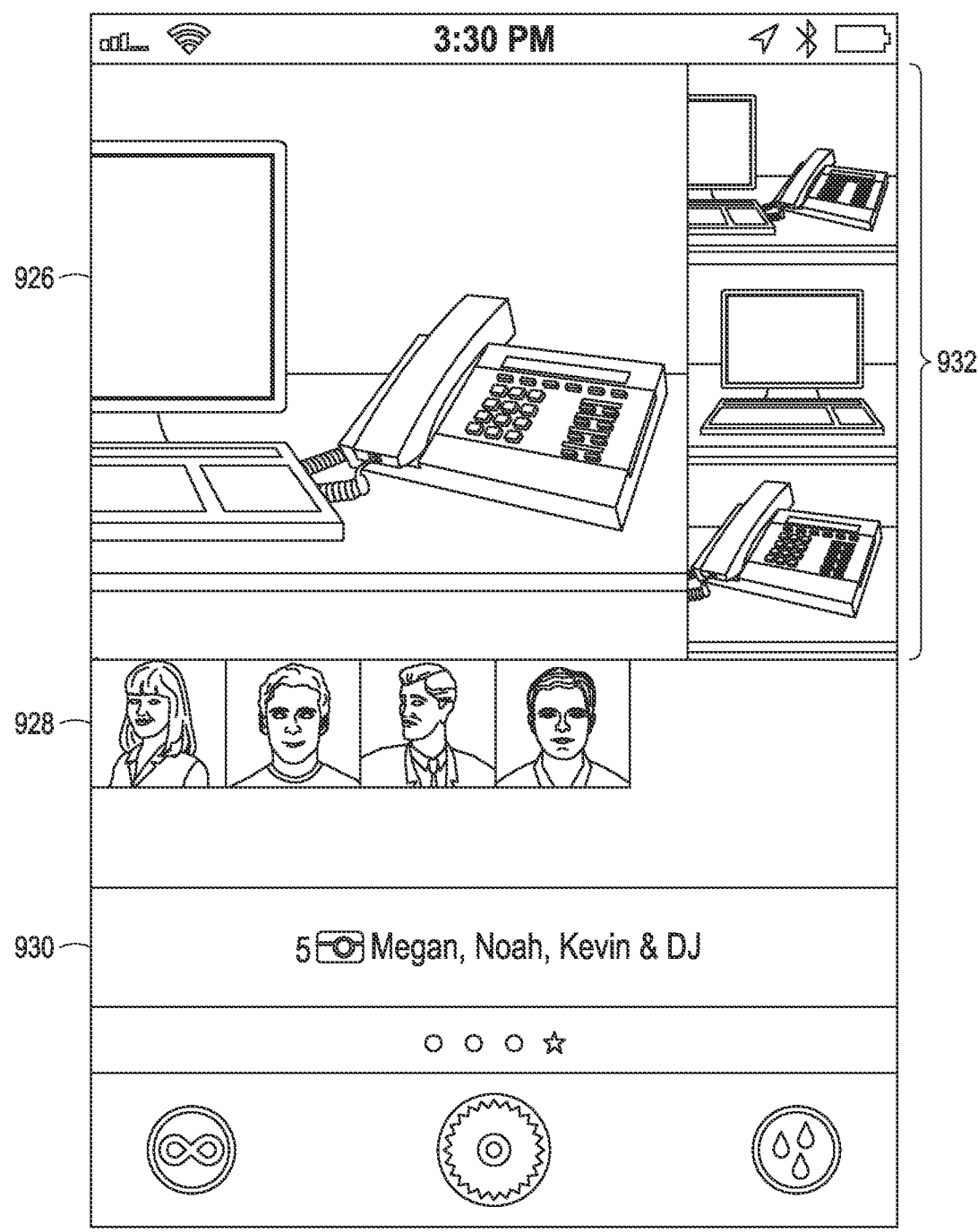

FIG. 9L illustrates another screen view of photos being posted in real-time to a current group 110, similar to the example of FIG. 9F. The user interface includes a photo strip 932 of the most recent photos being posted to the group 110, a large display window 926 of one of the photos, a photo icon ribbon 928 displaying the four members of the group 110 and their relative connection strength or affinity via the icons, and a group field 930 listing the members of the group 110.

Attached below are three appendixes, with each appendix providing an example Java® class of a function described above. Appendix 1 provides a definition of a SignalsScorer class that accepts a set of functions and data values, applies the functions to the data, and produces an output score. The class may take a valueFunction to be applied to each of the values individually, an agingFunction to modify each of the values based on their age, an arrayFunction to apply a modifying function to the values as a group, and a final-Function to generate the overall score for the values. The SignalsScorer class is used by both an example ContactScorer class (Appendix 2) and an example GroupPhotoRanker class (Appendix 3), both of which are shown below.

In Appendix 2, the example ContactScorer class (employed in the affinity calculator module 408 of FIG. 4) produces an affinity score for one client device in relation to another client device based on an aggregation of a number of interactions between the client devices, such as "likes" and text replies posted between the client devices, the number of times one of the client devices was joined to the same group as the other client device (automatically or explicitly), and other factors. The produced score is ultimately used to determine which contacts should be placed in an active content list for a client device.

Appendix 3 provides the example GroupPhotoRanker class, which calculates a score representing a connection strength or affinity for a client device in relation to a candidate group based on, for example, a group "pin" score (representing an amount or degree of "pinning," as described above), a group "join" score, a group "self-create" score, a friend contribution score, a friend presence score, a "loneliness" score (as discussed earlier), a Wi-Fi proximity score, and a space-time score. The GroupPhotoRanker class may be employed in the group content ranker module 410 of FIG. 4.

As a result of at least some of the embodiments discussed herein, sharing of content, such as still images, video clip, audio segments, and textual data, may be shared easily among a number of client devices that form their own "network" based on previous or current physical proximity, previous contacts between the various devices, and/or other factors. Such groups may be formed "on-the-fly" without the users of the client devices forming or configuring the group beforehand, without explicit authorization of the client devices, and without providing personally identifiable information of the users.

Modules, Components, and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations thereof. Example embodiments may be implemented using a computer program product (e.g., a computer program tangibly embodied in an information carrier in a machine-readable medium) for execution by, or to control the operation of, data processing apparatus (e.g., a programmable processor, a computer, or multiple computers).

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communications network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a field programmable gate array (FPGA) or an application-specific integrated circuit (ASIC)).

The computing system can include clients and servers. A client and server are generally remote from each other and typically interact through a communication network. The relationship of client and server arises by virtue of computer programs running on their respective computers and having a client-server relationship to each other. In embodiments deploying a programmable computing system, it will be appreciated that both hardware and software architectures may be considered. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set forth hardware (e.g., machine) and software architectures that may be deployed in various example embodiments.

Example Machine Architecture and Machine-Readable Medium

Figure 10:
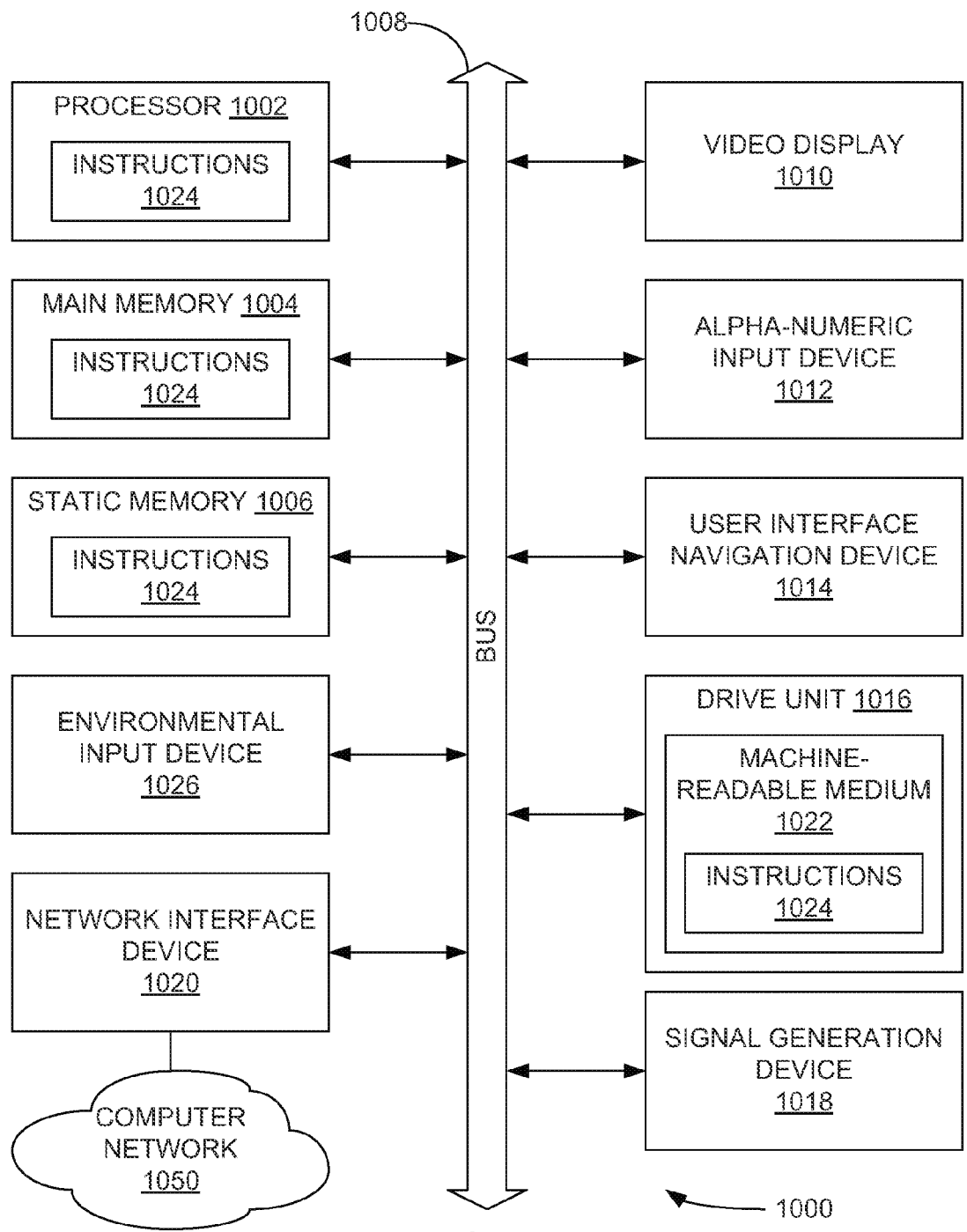
FIG. 10 is a diagrammatic representation of a machine in the example form of a computer system within which a set of instructions for causing the machine to perform any one or more of the methodologies discussed herein may be executed.

FIG. 10 is a block diagram of a machine in the example form of a computer system 1000 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU), or both), a main memory 1004, and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a user interface (UI) navigation device 1014 (e.g., a mouse), a disk drive unit 1016, a signal generation device 1018 (e.g., a speaker), and a network interface device 1020. The computer system 1000 may also include a environmental input device 1026 that may provide a number of inputs describing the environment in which the computer system 1000 or another device exists, including, but not limited to, any of a Global Positioning Sensing (GPS) receiver, a temperature sensor, a light sensor, a still photo or video camera, an audio sensor (e.g., a microphone), a velocity sensor, a gyroscope, an accelerometer, and a compass.

Machine-Readable Medium

The disk drive unit 1016 includes a machine-readable medium 1022 on which is stored one or more sets of data structures and instructions 1024 (e.g., software) embodying or utilized by any one or more of the methodologies or functions described herein. The instructions 1024 may also reside, completely or at least partially, within the main memory 1004 and/or within the processor 1002 during execution thereof by the computer system 1000, the main memory 1004 and the processor 1002 also constituting machine-readable media.

While the machine-readable medium 1022 is shown in an example embodiment to be a single medium, the term "machine-readable medium" may include a single medium or multiple media (e.g., a centralized or distributed database, and/or associated caches and servers) that store the one or more instructions 1024 or data structures. The term "non-transitory machine-readable medium" shall also be taken to include any tangible medium that is capable of storing, encoding, or carrying instructions for execution by the machine and that cause the machine to perform any one or more of the methodologies of the present subject matter, or that is capable of storing, encoding, or carrying data structures utilized by or associated with such instructions. The term "non-transitory machine-readable medium" shall accordingly be taken to include, but not be limited to, solid-state memories, and optical and magnetic media. Specific examples of non-transitory machine-readable media include, but are not limited to, non-volatile memory, including by way of example, semiconductor memory devices (e.g., Erasable Programmable Read-Only Memory (EPROM), Electrically Erasable Programmable Read-Only Memory (EEPROM), and flash memory devices), magnetic disks such as internal hard disks and removable disks, magneto-optical disks, and CD-ROM and DVD-ROM disks.

Transmission Medium

The instructions 1024 may further be transmitted or received over a computer network 1050 using a transmission medium. The instructions 1024 may be transmitted using the network interface device 1020 and any one of a number of well-known transfer protocols (e.g., HTTP). Examples of communication networks include a local area network (LAN), a wide area network (WAN), the Internet, mobile telephone networks, Plain Old Telephone Service (POTS) networks, and wireless data networks (e.g., WiFi and WiMAX networks). The term "transmission medium" shall be taken to include any intangible medium that is capable of storing, encoding, or carrying instructions for execution by the machine, and includes digital or analog communications signals or other intangible media to facilitate communication of such software.

CONCLUSION

Thus, a method and system to share content among several communication devices have been described. Although the present subject matter has been described with reference to specific example embodiments, it will be evident that various modifications and changes may be made to these embodiments without departing from the broader scope of the subject matter. For example, while the majority of the discussion above notes the use of the embodiments with respect to general-purpose computer systems and applications, other software- or firmware-based systems, such as electronic products and systems employing embedded firmware, may also be developed in a similar manner to that discussed herein. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

What is claimed is:

1. A method, comprising:
    selecting a first group of users from a plurality of possible groups of users;
    measuring affinity levels between a first user and each user in the first group, the affinity levels based at least partially on both passive and active interactions between an electronic device of the first user and electronic devices of each of the users in the first group;
    adding the first user to the first group based on the affinity levels and affinity levels among users in the first group; and
    removing a second user from the first group based on a drop in affinity level between the second user and other users in the first group.

2. The method of claim 1, wherein the affinity levels are further based on content sent by the first user.

3. The method of claim 2, wherein the affinity levels are further based on location of the electronic device of the first user when the content was sent and locations of electronic devices of users in the plurality of possible groups at times when the users in the plurality of possible groups sent content.

4. The method of claim 3, wherein the affinity levels are further based on a current location of the electronic device of the first user and current locations of electronic devices of users in the plurality of possible groups.

5. The method of claim 1, wherein the passive interactions include the electronic device of the first user left in close proximity to electronic devices of other users in the first group for a period of time.

6. The method of claim 5, wherein a passive interaction is weighted by a length of the period of time when using the passive interaction to calculate the affinity level.

7. The method of claim 6, wherein a physical distance between the electronic device of the first user and the electronic devices of other users in the first group is a factor in calculating the affinity levels.

8. A server comprising:
    a processor;
    a non-transitory computer-readable medium having instructions stored thereon, which, when executed by the processor, cause the server to:
        select a first group of users from a plurality of possible groups of users;
        measure affinity levels between a first user and each user in the first group among the, the affinity levels based at least partially on both passive and active interactions between an electronic device of the first user and electronic devices of each of the users in the first group;
        add the first user to the first group based on the affinity levels and affinity levels among users in the first group; and
        remove a second user from the first group based on a drop in affinity level between the second user and other users in the first group.

9. The server of claim 8, wherein the affinity levels are further based on content sent by the first user.

10. The server of claim 9, wherein the affinity levels are further based on location of the electronic device of the first user when the content was sent and locations of electronic devices of users in the plurality of possible groups at times when the users in the plurality of possible groups sent content.

11. The server of claim 10, wherein the affinity levels are further based on a current location of the electronic device of the first user and current locations of electronic devices of users in the plurality of possible groups.

12. The server of claim 8, wherein the passive interactions include the electronic device of the first user left in close proximity to electronic devices of other users in the first group for a period of time.

13. The server of claim 12, wherein a length of time the electronic device of the first user is left in close proximity to the electronic devices of other user devices in the first group is a factor in calculating the affinity levels.

14. The server of claim 13, wherein a physical distance between the electronic device of the first user and the electronic devices of other users in the first group is a factor in calculating the affinity levels.

15. A non-transitory computer-readable storage medium comprising instructions that, when executed by at least one processor of a machine, cause the machine to perform operations comprising:
    selecting a first group of users from a plurality of possible groups of users;
    measuring affinity levels between a first user and each user in the first group, the affinity levels based at least partially on both passive and active interactions between an electronic device of the first user and electronic devices of each of the users in the first group;
    adding the first user to the first group based on the affinity levels and affinity levels among users in the first group; and
    removing a second user from the first group based on a drop in affinity level between the second user and other users in the first group.

16. The non-transitory computer-readable storage medium of claim 15, wherein the affinity levels are further based on content sent by the first user.

17. The non-transitory computer-readable storage medium of claim 16, wherein the affinity levels are further based on location of the electronic device of the first user when the content was sent and locations of electronic devices of users in the plurality of possible groups at times when the users in the plurality of possible groups sent content.

18. The non-transitory computer-readable storage medium of claim 17, wherein the affinity levels are further based on location of the electronic device of the first user when the content was sent and locations of electronic devices of users in the plurality of possible groups at times when the users in the plurality of possible groups sent content.

19. The non-transitory computer-readable storage medium of claim 15, wherein the passive interactions include the electronic device of the first user left in close proximity to electronic devices of other users in the first group for a period of time.

20. The non-transitory computer-readable storage medium of claim 19, wherein a length of time the electronic device of the first user is left in close proximity to the electronic devices of other user devices in the first group is a factor in calculating the affinity levels.

\* \* \* \* \*